US008593577B2

United States Patent
Koike

(10) Patent No.: US 8,593,577 B2
(45) Date of Patent: Nov. 26, 2013

(54) IMAGE PICKUP APPARATUS AND CONTROL METHOD FOR IMAGE PICKUP APPARATUS, IMAGE DISPLAY APPARATUS AND CONTROL METHOD FOR IMAGE DISPLAY APPARATUS, AND RECORDING MEDIUM

(75) Inventor: Toru Koike, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1271 days.

(21) Appl. No.: 12/021,207

(22) Filed: Jan. 28, 2008

(65) Prior Publication Data

US 2008/0180551 A1  Jul. 31, 2008

(30) Foreign Application Priority Data

Jan. 30, 2007 (JP) ................................ 2007-020083

(51) Int. Cl.
*H04N 5/66* (2006.01)
*H04N 9/12* (2006.01)
*H04N 5/232* (2006.01)
*G06F 3/00* (2006.01)

(52) U.S. Cl.
USPC ................. 348/739; 348/211.2; 348/211.3; 710/15

(58) Field of Classification Search
USPC .............. 348/211.1–211.13, 220.1, 739–843; 710/15–18, 62–63
See application file for complete search history.

(56) References Cited

U.S. PATENT DOCUMENTS

| 7,339,610 B2* | 3/2008 | Kusaka ...................... 348/207.1 |
| 7,599,581 B2* | 10/2009 | Satoh et al. .................. 382/312 |
| 7,643,070 B2* | 1/2010 | Ono .............................. 348/239 |
| 7,710,464 B2* | 5/2010 | Hayashi ..................... 348/220.1 |
| 2004/0002327 A1* | 1/2004 | Tanaka ......................... 455/418 |
| 2005/0259948 A1* | 11/2005 | Ando ............................. 386/46 |
| 2006/0050785 A1* | 3/2006 | Watanabe et al. ........ 375/240.03 |
| 2006/0190633 A1* | 8/2006 | Cantwell et al. ................ 710/15 |
| 2006/0238524 A1* | 10/2006 | Hsieh et al. .................... 345/204 |
| 2006/0242669 A1* | 10/2006 | Wogsberg ........................ 725/74 |
| 2008/0065916 A1* | 3/2008 | Liu et al. ....................... 713/320 |
| 2008/0084834 A1* | 4/2008 | Stanek .......................... 370/284 |

FOREIGN PATENT DOCUMENTS

| JP | 2004-336566 A | 11/2004 |
| JP | 2005-109703 A | 4/2005 |
| JP | 2005-354487 A | 12/2005 |
| JP | 2006-086744 A | 3/2006 |
| JP | 2007-020038 A | 1/2007 |

* cited by examiner

*Primary Examiner* — Timothy J Henn
*Assistant Examiner* — Pritham Prabhakher
(74) *Attorney, Agent, or Firm* — Canon U.S.A., Inc., IP Division

(57) ABSTRACT

An image pickup apparatus operates in a normal power-consumption mode in the period after reception of an image-transfer request command from a digital television set until completion of an operation for transferring still image data in accordance with the image-transfer request command, and operates in a low power-consumption mode in the period after the completion of the operation for transferring the still image data in accordance with the image-transfer request command until reception of another image-transfer request command from the digital television set.

21 Claims, 13 Drawing Sheets

IMAGE PICKUP APPARATUS AND CONTROL METHOD FOR IMAGE PICKUP APPARATUS, IMAGE DISPLAY APPARATUS AND CONTROL METHOD FOR IMAGE DISPLAY APPARATUS, AND RECORDING MEDIUM

BACKGROUND OF THE INVENTION

1. Field of the Invention

The present invention relates to an image pickup apparatus and a control method for the image pickup apparatus, to an image display apparatus and a control method for the image display apparatus, and to a recording medium, and more particularly, to storing of still image data in a moving image format and transmission of the still image data stored in the moving image format.

2. Description of the Related Art

A method for connecting an image output apparatus, such as a digital camera, to a computer through a digital interface, such as a universal serial bus (USB), and providing a slide show has been available.

In recent years, as a digital interface used in image display systems, such as televisions, a high-definition multimedia interface (HDMI) has been adopted. In such a situation, it has been desirable that images captured by a digital image output apparatus, such as a digital camera, are output to and displayed on an image display apparatus, such as a television set, using the HDMI.

However, the HDMI handles images as moving images. Thus, it is necessary for the digital image output apparatus to continuously transmit to the image display apparatus an image of each frame in synchronization with a vertical synchronizing signal. Thus, even in a case where the digital image output apparatus outputs a still image to the image display apparatus, the digital image output apparatus always outputs images during execution of image display. As a result, the power consumption of the digital image output apparatus is large.

SUMMARY OF THE INVENTION

The present invention reduces, in the case of storing still image data in a moving image format and in the case of outputting the still image data to an image display apparatus, the power consumption of an apparatus that outputs the still image data.

According to an aspect of the present invention, an image pickup apparatus capable of being connected to an image display apparatus using a high-definition multimedia interface includes a command communication unit configured to transmit and receive a control command; an image transmission unit configured, when an image-transfer request command is received by the command communication unit, to store a certain number of pieces of still image data in a moving image format and to transmit the certain number of pieces of still image data, the certain number of pieces of still image data corresponding to a buffer capacity of the image display apparatus; and an operation stopping unit configured, after the image transmission unit completes the transmission, to temporarily stop at least some of operations of the image transmission unit.

Further features of the present invention will become apparent from the following description of exemplary embodiments with reference to the attached drawings.

DESCRIPTION OF THE EMBODIMENTS

First Embodiment

A first embodiment of the present invention will be described with reference to the drawings.

Figure 1:
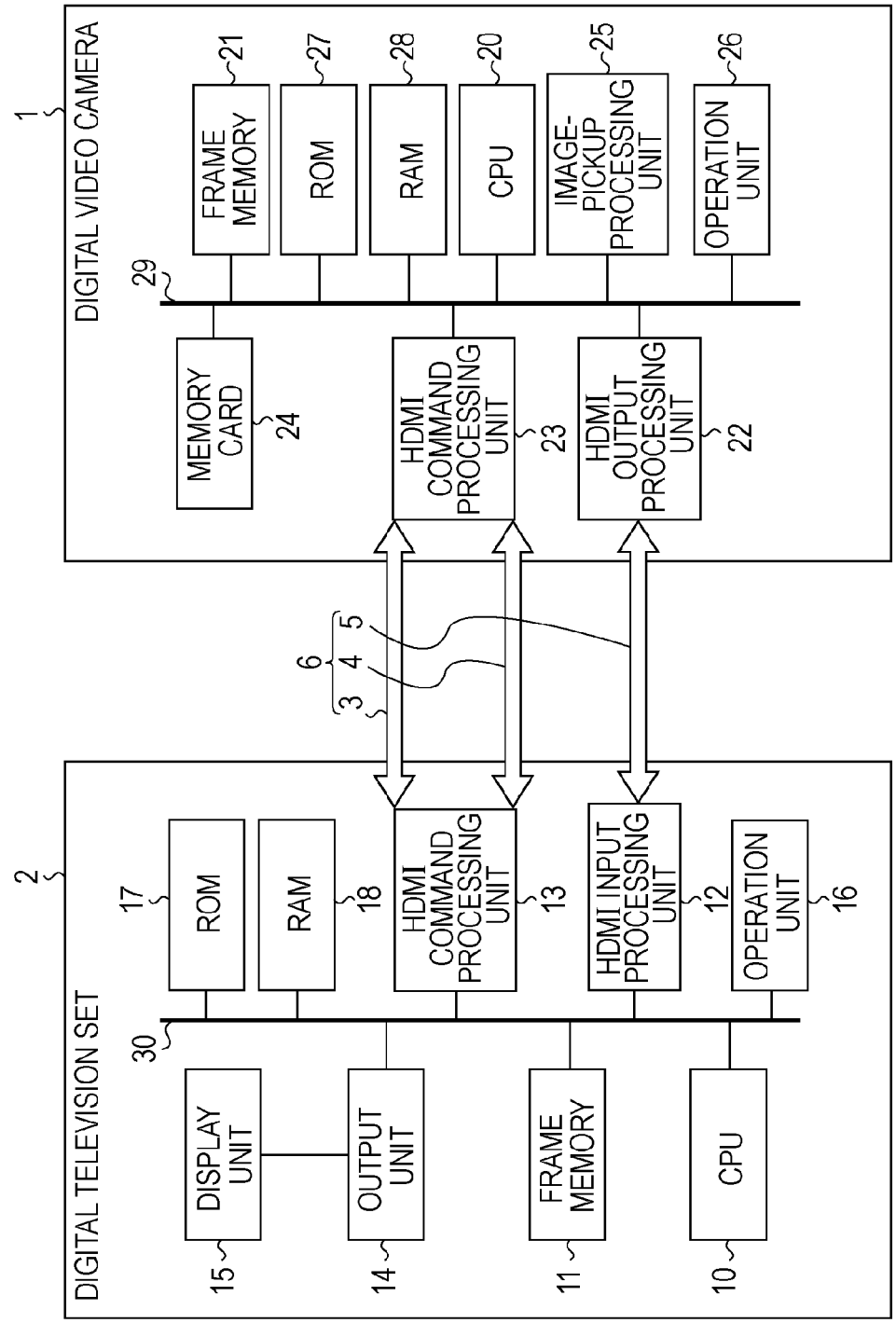
FIG. 1 illustrates an example of the configuration of an image display system according to a first embodiment of the present invention.

FIG. 1 illustrates an example of the configuration of an image display system configured to control, process, and display data in accordance with the present invention.

Referring to FIG. 1, a digital video camera 1, which is an example of an image pickup apparatus, is connected to a digital television set 2, which is an example of an image display apparatus, through a cable 6 for storing still image data in a moving image format and transmitting the still image data in accordance with the HDMI. Hereinafter, the cable 6, which stores still image data in the moving image format and transmits the still image data in accordance with the HDMI, is referred to as an HDMI cable 6.

The HDMI cable 6 includes a consumer electronics control (CEC) unit 3. The HDMI cable 6 also includes a display data channel (DDC) unit 4. The HDMI cable 6 also includes a transition minimized differential signaling (TMDS) unit 5. The CEC unit 3 and the DDC unit 4 are used when control commands are transmitted and received between the digital video camera 1 and the digital television set 2. The TMDS unit 5 is used when the digital video camera 1 transmits image data to the digital television set 2.

The digital video camera 1 includes a central processing unit (CPU) 20, a frame memory 21, an HDMI output processing unit 22, an HDMI command processing unit 23, a memory card 24, an image-pickup processing unit 25, an operation unit 26, a read-only memory (ROM) 27, and a random-access memory (RAM) 28, which are interconnected by a bus 29.

For example, the CPU 20 executes a program stored in the ROM 27 and uses the RAM 28 as a work area. Accordingly, the CPU 20 performs integrated control of the system of the digital video camera 1.

The operation unit 26 is operated by a user to enter an instruction to the digital video camera 1.

The image-pickup processing unit 25 includes an image pickup element for capturing a moving image and a still image, an analog-to-digital (A/D) converter for converting an analog image signal captured by the image pickup element into a digital image signal, and an image processing circuit for performing signal processing on the digital image signal obtained by the A/D converter. For example, the image processing circuit performs gamma correction, white balance control, and the like for a digital image signal obtained by the A/D converter to generate image data that can be displayed on the digital television set 2. The image processing circuit stores the generated image data into the frame memory 21 or the memory card 24 in accordance with an operation of the operation unit 26. The image processing circuit does not necessarily perform the signal processing just as described above. For example, the image processing circuit may compress image data and then store the compressed image data into the frame memory 21 or the memory card 24.

The HDMI command processing unit 23 transmits and receives control commands to and from the digital television set 2. A protocol for a control command is implemented by the CEC or the DDC of the HDMI. For example, control commands include information, such as a request for transfer of still image data, a transfer response for still image data, the sizes of the frame memories 11 and 21, the position of an image where a slide show starts, and the like. Control commands also include information on updating of a digital print order format (DPOF) and an exchangeable image file format (Exif).

The HDMI output processing unit 22 transfers still image data to the digital television set 2 in accordance with an instruction from the CPU 20. In the first embodiment, the HDMI output processing unit 22 transfers to the digital television set 2 still image data to be used for a slide show. When the HDMI command processing unit 23 receives an image-transfer request command, which indicates a request for transfer of still image data, as a control command, the CPU 20 reads from the frame memory 21 or the memory card 24 still image data to be used for a slide show. The CPU 20 outputs the read still image data to the HDMI output processing unit 22. The HDMI output processing unit 22 enters the still image data to be used for a slide show into an HDMI frame format, which is a well known type of moving image format, and transfers the still image data to the digital television set 2 (an HDMI input processing unit 12) through the HDMI cable 6. At this time, in order to avoid the presence of still image data neglected by the digital television set 2 and the digital video camera 1, the HDMI output processing unit 22 embeds a serial number in still image data, for example, in a blanking period of the HDMI frame format.

The digital video camera 1 having the above-described configuration supports a normal power-consumption mode and a low power-consumption mode having a power consumption lower than that required in the normal power-consumption mode. In the first embodiment, the low power-consumption mode is a mode in which the power consumption of the digital video camera 1 is reduced by temporarily stopping transfer of still image data using the TMDS 5 by the HDMI output processing unit 22. In the case of using the TMDS 5, since still image data is transferred at a high speed, a large power consumption is required. In the first embodiment, a reduction in the power consumption is achieved by stopping at least some (part or all) of operations of the HDMI output processing unit 22 during the period in which the HDMI output processing unit 22 is not transferring still image data to the digital television set 2. Even after an operation of the HDMI output processing unit 22 is stopped, the HDMI command processing unit 23 is capable of transmitting and receiving a control command.

The digital television set 2 includes a CPU 10, a frame memory 11, the HDMI input processing unit 12, an HDMI command processing unit 13, an output unit 14, a display unit 15, an operation unit 16, a ROM 17, and a RAM 18, which are interconnected by a bus 30.

For example, the CPU 10 executes a program stored in the ROM 17 and uses the RAM 18 as a work area. Accordingly, the CPU 10 performs integrated control of the system of the digital television set 2.

The operation unit 16 is operated by a user to enter an instruction to the digital television set 2.

The HDMI command processing unit 13 transmits and receives control commands to and from the digital video camera 1.

The HDMI input processing unit 12 acquires still image data transferred from the digital video camera 1 (the HDMI output processing unit 22). In the first embodiment, the HDMI input processing unit 12 acquires from the digital video camera 1 still image data to be used for a slide show. As described above, the digital video camera 1 transfers to the digital television set 2 still image data entered in the HDMI frame format using the TMDS of the HDMI. Thus, the HDMI input processing unit 12 acquires still image data entered in the HDMI frame format.

The CPU 10 stores into the frame memory 11 still image data received by the HDMI input processing unit 12. More specifically, the CPU 10 extracts still image data received by the HDMI input processing unit 12 from the HDMI frame format and stores the still image data into the frame memory 11 in order.

After reading still image data stored in the frame memory 11, the CPU 10 outputs the read still image data to the output unit 14. The output unit 14 processes the still image data into a form suitable to be used for a slide show to be provided by the display unit 15 and outputs the processed still image data to the display unit 15. The display unit 15 provides a slide show using the still image data output from the output unit 14. The display unit 15 includes a computer display device, such as a liquid crystal display (LCD).

FIGS. 2A to 2E schematically illustrate examples of the state of the frame memory 11 when a storing operation and a playback operation for still image data are performed.

The CPU 10 performs a storing operation and a playback operation for still image data using the frame memory 11. The storing operation for still image data is an operation for sequentially storing a plurality of pieces of still image data transferred from the digital video camera 1. The playback operation for still image data is an operation for sequentially reading a plurality of pieces of still image data from the frame memory 11.

The frame memory 11 includes a plurality of memory sections. Thus, the frame memory 11 can be physically configured to include a plurality of memory areas. Alternatively, the frame memory 11 may be formed by logically dividing a physically single memory into a plurality of memory areas. In FIGS. 2A to 2E, examples of the state of the frame memory 11 when a slide show is provided in a case where the frame memory 11 includes two memory areas (frame memory areas A and B) are schematically illustrated.

Figure 2A:
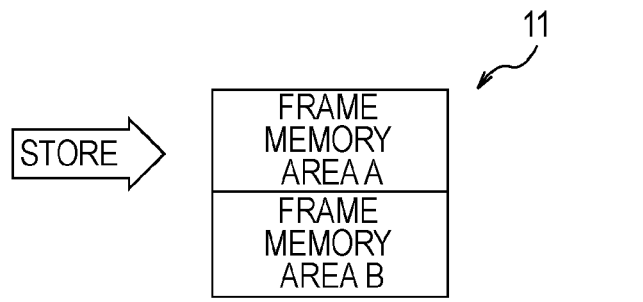
FIGS. 2A to 2E schematically illustrate examples of the state of a frame memory used in the first embodiment when a storing operation and a playback operation for still image data are performed.

FIG. 2A illustrates the state of the frame memory 11 immediately after the digital video camera 1 and the digital television set 2 are connected to each other. Referring to FIG. 2A, still image data transferred first from the digital video camera 1 is stored into the frame memory area A, which is a first memory area.

Figure 2B:
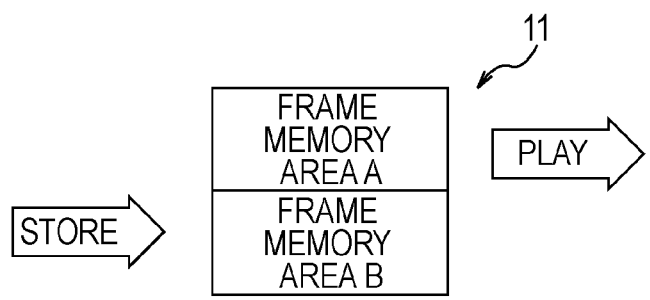

FIG. 2B illustrates the state of the frame memory 11 when the still image data stored in the frame memory area A is played back and still image data is stored into the frame memory area B, which is a second memory area. Referring to FIG. 2B, playback (slide show) using the still image data stored in the frame memory area A in the state shown in FIG. 2A is performed. Then, still image data transferred second from the digital video camera 1 is stored into the frame memory area B.

Figure 2C:
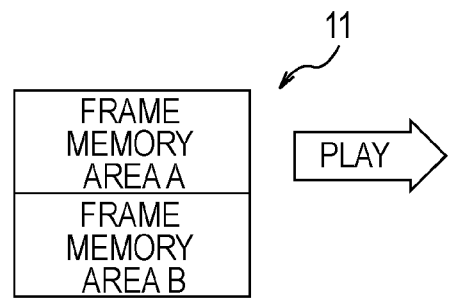

FIG. 2C illustrates the state of the frame memory 11 when the playback (slide show) using the still image data stored in the frame memory area A is continued. Referring to FIG. 2C, storing of the still image data into the frame memory area B, which is performed in the state shown in FIG. 2B, has been completed.

Figure 2D:
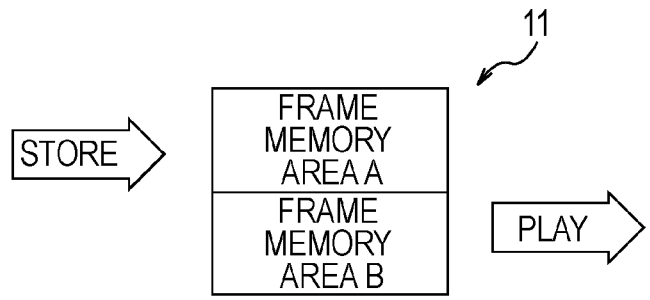

FIG. 2D illustrates the state of the frame memory 11 when the still image data stored in the frame memory area B is played back and still image data is stored into the frame memory area A. Referring to FIG. 2D, playback (slide show) using the still image data stored in the frame memory area B in the state shown in FIG. 2B is performed. Then, still image data transferred third from the digital video camera 1 is stored into the frame memory area A.

Figure 2E:
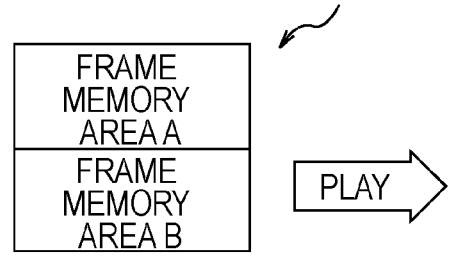

FIG. 2E illustrates the state of the frame memory 11 when playback (slide show) using the still image data stored in the frame memory area B is continued. Referring to FIG. 2E, storing of the still image data into the frame memory area A, which is performed in the state shown in FIG. 2D, has been completed.

Subsequently, storing and playback of still image data is repeatedly performed as shown in FIGS. 2B to 2E, and a slide show is provided.

As described above, in the first embodiment, still image data to be used for a slide show is transferred in advance from the digital video camera 1 to the digital television set 2 so that the slide show can be provided.

During the period in which the digital television set 2 performs only a playback operation of still image data, as shown in FIGS. 2C and 2E, the digital video camera 1 is in the low power-consumption mode. Thus, the power consumption of the digital video camera 1 is reduced and a reduction in the power consumption of the battery of the digital video camera 1 is achieved.

An example of a process for storing still image data performed by the digital television set 2 will be described with reference to a flowchart shown in FIG. 3.

Figure 3:
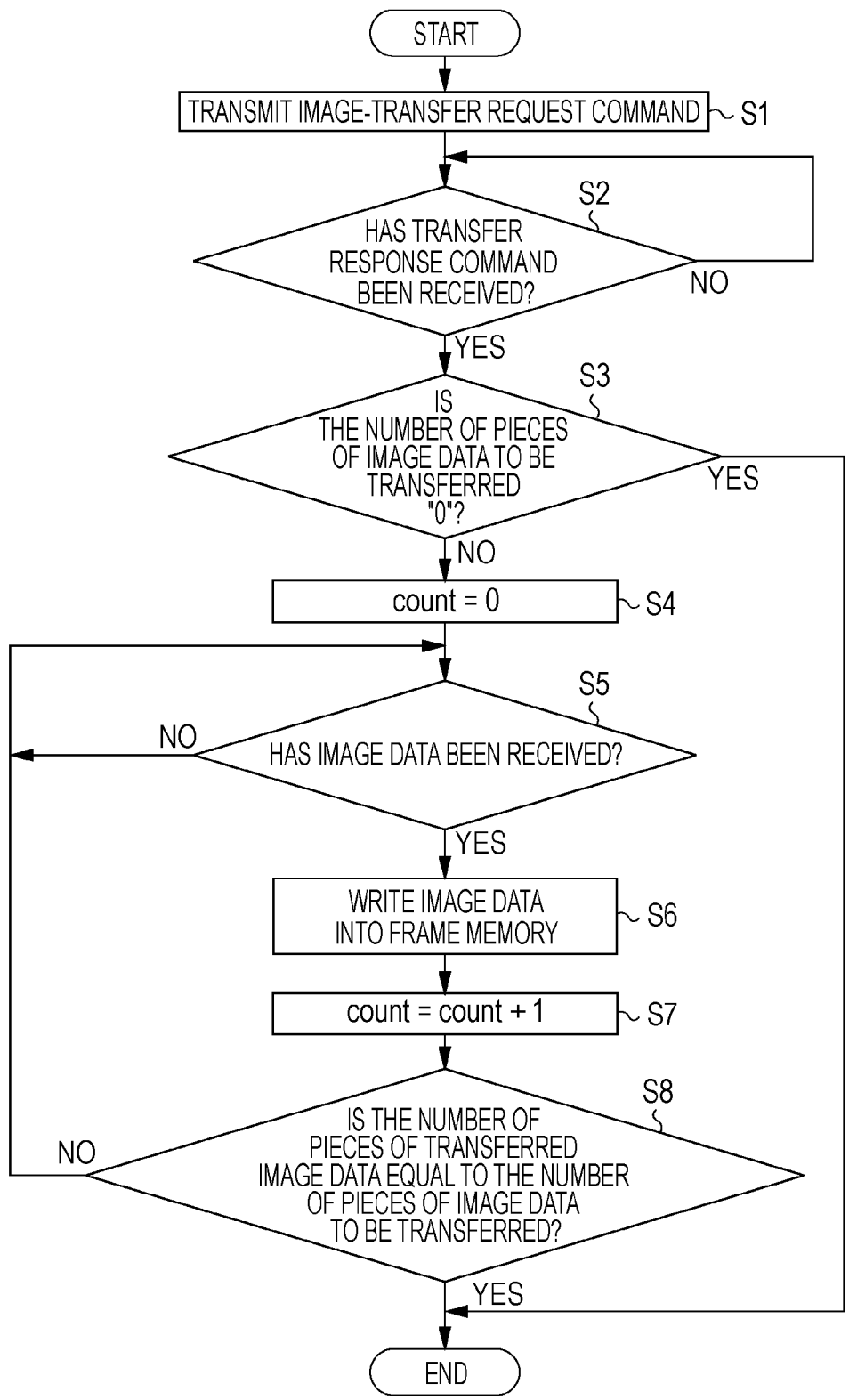
FIG. 3 is a flowchart illustrating an example of a process for storing still image data performed by a digital television set according to the first embodiment.

After the digital video camera 1 and the digital television set 2 are connected to each other through the HDMI cable 6, when a user operates the operation units 16 and 26 to issue an instruction to start a slide show, the process represented by the flowchart shown in FIG. 3 starts.

In order to store still image data to be used for a slide show into the frame memory 11, the HDMI command processing unit 13 generates, as a control command, an image-transfer request command, which indicates a request for transfer of still image data, in accordance with an instruction from the CPU 10. The HDMI command processing unit 13 transmits the image-transfer request command, which is generated in accordance with the instruction from the CPU 10, to the digital video camera 1 (the HDMI command processing unit 23) through the HDMI cable 6 (step S1). The image-transfer request command contains maximum-number-of-pieces-of-allowable-still-image-data information relating to the maximum number of pieces of still image data that can be stored in the frame memory 11 (the maximum number of pieces of allowable still image data (max_maisu)). The maximum-number-of-pieces-of-allowable-still-image-data information is calculated by the CPU 10, for example, in accordance with the storage capacity of the frame memory 11 and the average size of a piece of still image data to be played back.

In the first embodiment, for example, a command communication unit is implemented using the HDMI command processing units 13 and 23. In addition, in the first embodiment, an image request command is implemented by the image-transfer request command. In addition, in the first embodiment, a command communication step is implemented by the processing of step S1.

The HDMI command processing unit 13 waits until a transfer response command, which is a response to the image-transfer request command transmitted in step S1, is transmitted from the digital video camera 1 (the HDMI command processing unit 23) (step S2). The transfer response command contains number-of-pieces-of-still-image-data-to-be-transferred information relating to the number of pieces of still image data to be transferred from the digital video camera 1 (maisu).

In the first embodiment, a transmission command is implemented by the transfer response command, and number-of-pieces-of-still-image-data-to-be-transmitted information is used as the number-of-pieces-of-still-image-data-to-be-transferred information. In addition, in the first embodiment, the command communication step is implemented by the processing of step S2.

When the transfer response command is received, the CPU 10 determines whether the number of pieces of still image data to be transferred from the digital video camera 1 (maisu) is "0" in accordance with the number-of-pieces-of-still-image-data-to-be-transferred information contained in the transfer response command (step S3). If it is determined in step S3 that the number of pieces of still image data to be transferred from the digital video camera 1 (maisu) is "0", the process represented by the flowchart shown in FIG. 3 is terminated. If it is determined in step S3 that the number of pieces of still image data to be transferred from the digital video camera 1 (maisu) is not "0", the process proceeds to step S4.

In order to prepare for reception of still image data, the CPU 10 initializes the value indicated by a counter (count), which indicates the number of pieces of transferred still image data, to "0" (in step S4). The value indicated by the counter is stored, for example, in the RAM 18.

Then, the HDMI input processing unit 12 waits until still image data is received from the digital video camera 1 (the HDMI output processing unit 22) (step S5). As described above, still image data entered in the HDMI frame format is received. When receiving still image data from the digital video camera 1, the HDMI input processing unit 12 fetches the still image data entered in the HDMI frame format.

In the first embodiment, for example, an image reception unit is implemented by the HDMI input processing unit 12.

The HDMI input processing unit 12 sequentially writes the fetched still image data into write addresses of the frame memory 11 (step S6). A write address is designated by the CPU 10. For example, the write address is obtained by adding the value indicated by the counter (count), which indicates the number of pieces of transferred still image data, to a base address. The base address is, for example, the initial address of the frame memory area A or the frame memory area B shown in FIG. 2. For example, the CPU 10 determines a frame memory area into which still image data is to be stored in accordance with the states of the frame memory areas A and B shown in FIG. 2, and designates the initial address of the determined frame memory area as the base address. It is desirable that as many pieces of still image data as possible within the range not exceeding the upper limit of the storage capacity of the frame memory 11 are stored in the frame memory 11.

In the first embodiment, for example, an image storing unit is implemented by the HDMI input processing unit 12. In addition, in the first embodiment, a storage medium is implemented using the frame memory 11. In addition, in the first embodiment, an image storing step is implemented by the processing of step S6.

Then, the CPU 10 increments the value of the counter (count), which indicates the number of pieces of transferred still image data, by 1 (step S7).

The CPU 10 determines whether the number of pieces of transferred still image data is equal to the number of pieces of still image data to be transferred from the digital video camera 1 (maisu) (step S8). The number of pieces of transferred still image data is obtained from the value of the counter (count), which indicates the number of pieces of transferred still image data. The number of pieces of still image data to be transferred from the digital video camera 1 (maisu) is obtained from the number-of-pieces-of-still-image-data-to-be-transferred information contained in the transfer response command transmitted in step S2.

If it is determined in step S8 that the number of pieces of transferred still image data is not equal to the number of piece of still image data to be transferred from the digital video camera 1 (maisu), the process returns to step S5. Then, the processing of steps S5 to S8 is repeated until the number of pieces of transferred still image data becomes equal to the number of pieces of still image data to be transferred from the digital video camera 1. When the number of pieces of transferred still image data is equal to the number of pieces of still image data to be transferred from the digital video camera 1 (maisu), the process represented by the flowchart shown in FIG. 3 is terminated.

In the first embodiment, an image reception step is implemented by the processing of steps S5 to S8. In addition, for example, a number-of-pieces-of-still-image-data determination unit is implemented using the CPU 10. In addition, in the first embodiment, a number-of-pieces-of-still-image-data determination step is implemented by the processing of step S8.

As described above, in the first embodiment, still image data to be used for a slide show can be transferred in advance to the digital television set 2 by transferring control commands between the digital video camera 1 and the digital television set 2. The still image data transferred to the digital television set 2 can be extracted from the HDMI frame format and sequentially stored into the frame memory 11.

An example of a process for playback (slide show) of still image data performed by the digital television set 2 will be described with reference to a flowchart shown in FIG. 4.

Figure 4:
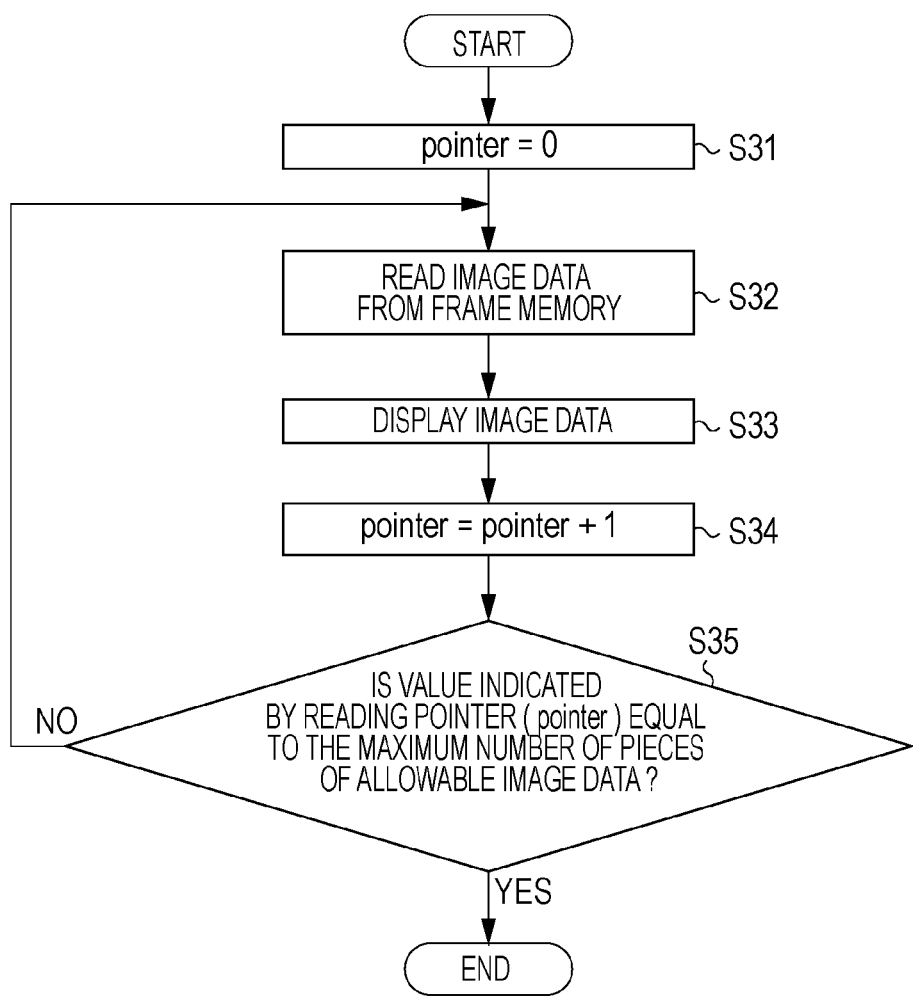
FIG. 4 is a flowchart illustrating an example of a process for playback (slide show) of still image data performed by the digital television set according to the first embodiment.

After the digital video camera 1 and the digital television set 2 are connected to each other through the HDMI cable 6, when still image data is stored into the frame memory 11 in accordance with the flowchart shown in FIG. 3, the process represented by the flowchart shown in FIG. 4 starts.

In order to prepare for reading of still image data from the frame memory 11, the CPU 10 initializes the value indicated by a reading pointer (pointer) to "0" (step S31). The value indicated by the reading pointer is stored, for example, in the RAM 18.

The CPU 10 reads still image data from the frame memory 11, and outputs the read still image data to the output unit 14 (step S32). A read address used for reading still image data from the frame memory 11 is obtained by adding the value indicated by the reading pointer to a base address. The base address is, for example, the initial address of the frame memory area A or the frame memory area B shown in FIG. 2. For example, the CPU 10 determines a frame memory area that stores still image data to be played back in accordance with the states of the frame memory areas A and B shown in FIG. 2, and designates the initial address of the determined frame memory area as the base address.

Then, the output unit 14 processes the still image data received in step S32 into a form suitable to be used for a slide show to be provided by the display unit 15, and outputs the processed still image data to the display unit 15. The display unit 15 provides a slide show by displaying the still image data output from the output unit 14 (step S33).

In the first embodiment, an image display unit is implemented using the output unit 14 and the display unit 15. In addition, in the first embodiment, an image display step is implemented by the processing of step S33.

In order to play back still image data to be displayed next, the CPU 10 increments the value indicated by the reading pointer (pointer) by "1" (step S34).

Then, in order to determine whether the image playback process is to be terminated, the CPU 10 determines whether the value indicated by the reading pointer (pointer) is equal to the maximum number of pieces of still image data that can be stored in the frame memory 11 (step S35). If it is determined in step S35 that the value indicated by the reading pointer (pointer) is not equal to the maximum number of pieces of still image data that can be stored in the frame memory 11, the process returns to step S32.

The processing of steps S32 to S35 is repeated until the value indicated by the reading pointer (pointer) becomes equal to the maximum number of pieces of still image data that can be stored in the frame memory 11. When the value indicated by the reading pointer (pointer) is equal to the maximum number of pieces of still image data that can be stored in the frame memory 11, the process represented by the flowchart shown in FIG. 4 is terminated.

As described above, in the first embodiment, a slide show using still image data stored in the frame memory 11 can be provided in accordance with the process represented by the flowchart shown in FIG. 4.

In a case where the digital television set 2 receives from the digital video camera 1 a transfer interruption command or a transfer cancellation command for interrupting or canceling the transfer of still image data in the process represented by the flowchart shown in FIG. 3 or 4, the digital television set 2 terminates the process for storing still image data.

When the process for storing still image data shown in FIG. 3 is being performed and a slide show is not being provided, it is desirable that the output unit 14 freezes or blacks out the display screen of the display unit 15.

An example of a process for transferring still image data performed by the digital video camera 1 will be described with reference to a flowchart shown in FIG. 5.

Figure 5:
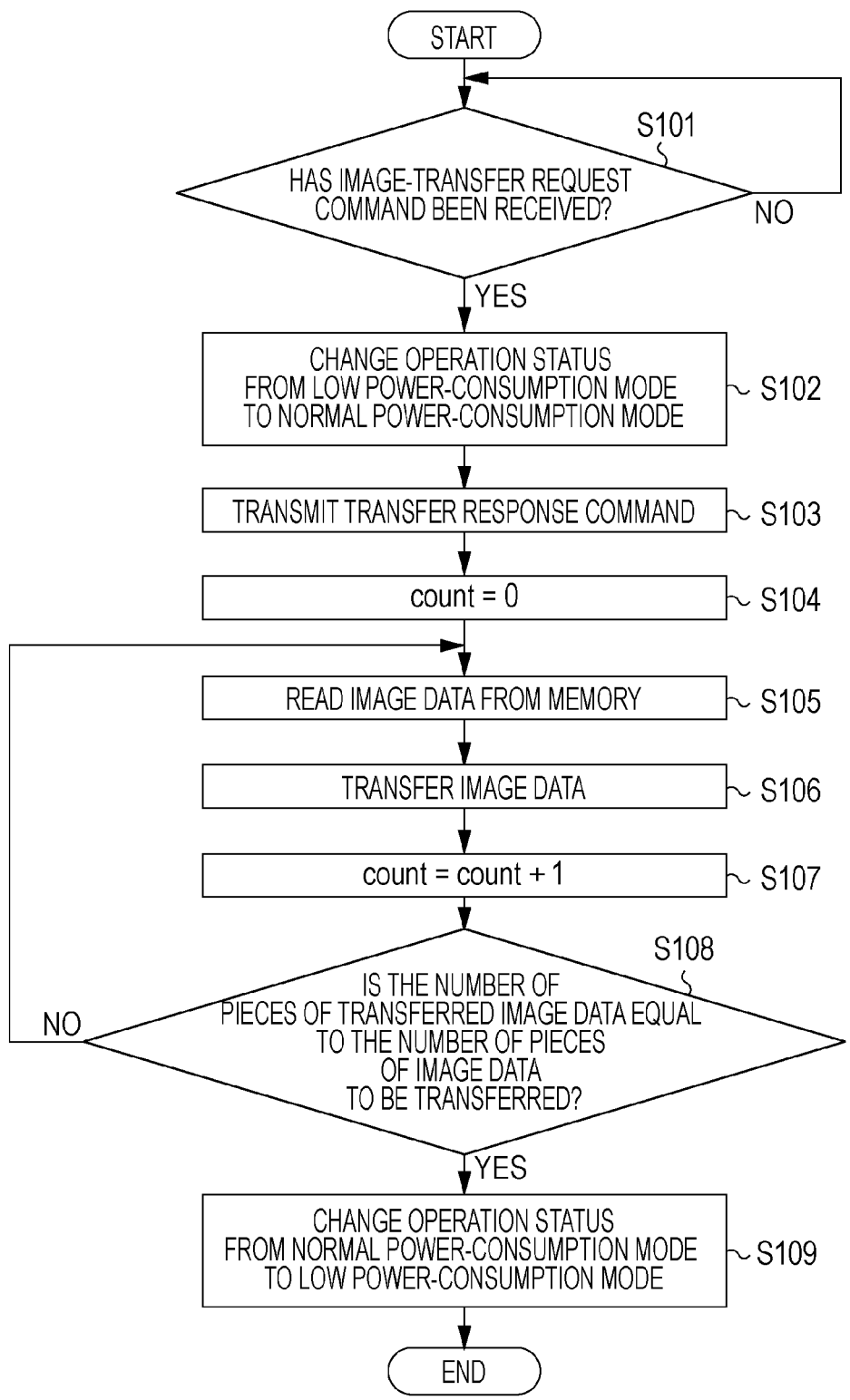
FIG. 5 is a flowchart illustrating an example of a process for transferring still image data performed by a digital video camera according to the first embodiment.

After the digital video camera 1 and the digital television set 2 are connected to each other through the HDMI cable 6, when a user operates the operation units 16 and 26 to issue an instruction to start a slide show, the process represented by the flowchart shown in FIG. 5 starts. As described above, the digital video camera 1 is in the low power-consumption mode during the period in which the digital video camera 1 is not transferring still image data, thus reducing the power consumption of the battery. The low power-consumption mode is a mode in which processing performed by the HDMI output processing unit 22 for transferring still image data in accordance with the TMDS is stopped.

In order to transfer still image data to be used for a slide show, the HDMI command processing unit 23 waits until an image-transfer request command, which indicates a request for transfer of still image data, is received from the digital television set 2 (the HDMI command processing unit 13) (step S101). As described above, the image-transfer request command contains maximum number-of-pieces-of allowable-still-image-data information relating to the maximum number of pieces of still image data that can be stored in the frame memory 11 (max_maisu).

In the first embodiment, the command communication step is implemented by the processing of step S101.

When receiving the image-transfer request command, the CPU 20 changes the operation status from the low power-consumption mode to the normal power-consumption mode (step S102). The CPU 20 starts at least some of operations of the HDMI output processing unit 22 that performs processing in accordance with the TMDS.

In the first embodiment, an operation resumption unit is implemented using the CPU 20. In addition, in the first embodiment, an operation resumption step is implemented by the processing of step S102.

After starting of the HDMI output processing unit 22 and preparation for transfer of still image data are completed, the HDMI command processing unit 23 generates a transfer response command, which is a response to the image-transfer request command, in accordance with an instruction from the CPU 20. The HDMI command processing unit 23 transmits the generated transfer response command to the digital television set 2 (the HDMI command processing unit 13) (step S103). As described above, the transfer response command contains number-of-pieces-of-still-image-data-to-be-transferred information, which relates to the number of pieces of still image data to be transferred from the digital video camera 1 (maisu). The CPU 20 determines the contents of the number-of-pieces-of-still-image-data-to-be-transferred information in accordance with the maximum-number-of-pieces-of-allowable-still-image-data information contained in the image-transfer request command such that the number of pieces of still image data to be transferred from the digital video camera 1 does not exceed the storage capacity of the frame memory 11 of the digital television set 2. The CPU 20 determines the contents of the number-of-pieces-of-still-image-data-to-be-transferred information such that the number of pieces of still image data to be transferred from the digital video camera 1 (maisu) does not exceed the maximum number of pieces of still image data that can be stored in the frame memory 11 (max_maisu).

In the first embodiment, the command communication step is implemented by the processing of step S103.

The CPU 20 initializes the value of the counter (count), which indicates the number of pieces of transferred still image data, to "0" (step S104).

The CPU 20 reads from the memory card 24 or the frame memory 21 still image data to be transferred to the digital television set 2, for example, in accordance with an operation of the operation unit 26, (step S105). The HDMI output processing unit 22 enters the still image data, which is read by the CPU 20, in the HDMI frame format, and transfers the still image data to the digital television set 2 (the HDMI input processing unit 12) (step S106).

In the first embodiment, for example, the image transmission unit is implemented using the HDMI output processing unit 22. In addition, in the first embodiment, an image transmission step is implemented by the processing of step S106.

After the still image data is transferred, the CPU 20 increments the value of the counter (count), which indicates the number of pieces of transferred still image data, by "1" (Step S107).

The CPU 20 determines whether the value of the counter (count), which indicates the number of pieces of transferred still image data, is equal to the number of pieces of still image data to be transferred from the digital video camera 1 (maisu) (step S108). If it is determined in step S108 that the value of the counter (count), which indicates the number of pieces of transferred still image data, is not equal to the number of pieces of still image data to be transferred from the digital video camera 1 (maisu), the process returns to step S105. The processing of steps S105 to S108 is repeated until the value of the counter (count), which indicates the number of pieces of transferred still image data, becomes equal to the number of pieces of still image data to be transferred from the digital video camera 1 (maisu).

In the first embodiment, for example, a determination unit is implemented using the CPU 20. In addition, in the first embodiment, a determination step is implemented by the processing of step S108.

Accordingly, when the value of the counter (count), which indicates the number of pieces of transferred still image data, becomes equal to the number of pieces of still image data to be transferred from the digital video camera 1 (maisu), the process proceeds to step S109. The CPU 20 changes the operation status from the normal power-consumption mode to the low power-consumption mode (step S109). The CPU 20 temporarily stops at least some of operations of the HDMI output processing unit 22 that performs processing in accordance with the TMDS. Then, the process represented by the flowchart shown in FIG. 5 is terminated. Subsequently, the digital video camera 1 keeps the low power-consumption mode until the digital video camera 1 receives the next image-transfer request command from the digital television set 2.

In the first embodiment, for example, an operation stopping unit is implemented using the CPU 20. In addition, in the first embodiment, an operation stopping step is implemented by the processing of step S109.

As described above, in the first embodiment, since the digital video camera 1 is in the low power-consumption mode (sleep mode) during the period in which the digital video camera 1 is not transferring still image data, a reduction in the power consumption of the battery can be achieved. In addition, in the first embodiment, control of starting and stopping of the some of operations of the HDMI output processing unit 22 that performs processing in accordance with the TMDS can be performed in accordance with an image-transfer request command transmitted from the digital television set 2.

In order to interrupt or cancel the transfer of still image data in the process represented by the flowchart shown in FIG. 5, the HDMI command processing unit 23 generates a transfer interruption command or a transfer cancellation command in accordance with an instruction from the CPU 20 and transmits the generated command to the digital television set 2. Thus, the digital television set 2 is informed of the interruption or cancellation of the transfer of the still image data. Accordingly, in the first embodiment, a transmission cancellation command is implemented using, for example, the transfer interruption command or the transfer cancellation command.

Accordingly, a slide show can be provided while the power consumption of the digital video camera 1 is reduced compared with a digital video camera of the related art.

Figure 6:
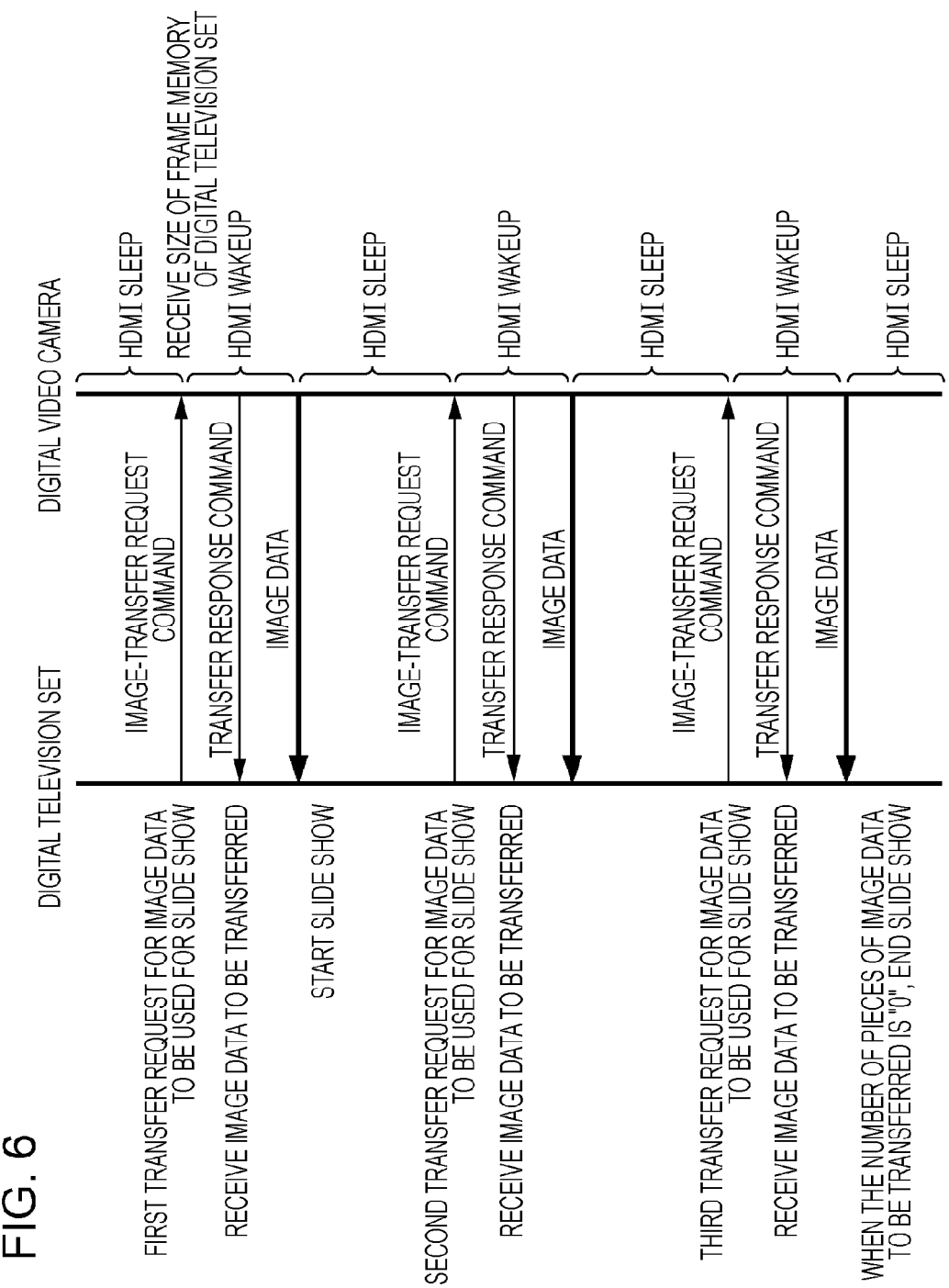
FIG. 6 illustrates an example of operations of the digital television set and operations of the digital video camera according to the first embodiment when a slide show is provided.

FIG. 6 illustrates an example of operations of the digital television set 2 and operations of the digital video camera 1 performed when a slide show is provided. The operations are performed in order from the top to the bottom of FIG. 6. An "HDMI wakeup" state indicates a state in the normal power-consumption mode. An "HDMI sleep" state indicates a state in the low power-consumption mode.

Referring to FIG. 6, the digital television set 2 transmits an image-transfer request command to the digital video camera 1.

When receiving the image-transfer request command from the digital television set 2, the digital video camera 1 changes the operation status from the low power-consumption mode to the normal power-consumption mode and prepares for transfer of still image data. After the preparation for transfer of still image data is completed, the digital video camera 1 transmits a transfer response command to the digital television set 2.

Then, the digital video camera 1 transfers still image data to be used for a slide show to the digital television set 2. After transferring the still image data to the digital television set 2, the digital video camera 1 changes the operation status from the normal power-consumption mode to the low power-consumption mode. The digital video camera 1 stops at least some of operations of the HDMI output processing unit 22 that performs processing in accordance with the TMDS. The digital video camera 1 keeps the low power-consumption mode until the digital video camera 1 receives the next image-transfer request command from the digital television set 2.

When receiving the still image data, the digital television set 2 stores the received still image data into the frame memory 11. After storing the still image data into the frame memory 11, the digital television set 2 starts a slide show by playing back the still image data. After completing the playback of the still image data stored in the frame memory area A or B to which the digital television set 2 refers, the digital television set 2 refers to the frame memory area A or B in which still image data to be played back next is stored. The digital television set 2 continues the slide show by playing back the still image data stored in the frame memory area A or B.

Storing of still image data into the frame memory 11 (the frame memory area A or B) is performed when a free space is generated in the frame memory 11 (the frame memory area A or B). The state in which a free space exists in the frame memory 11 (the frame memory area A or B) is a state in which still image data is not stored or a state in which only still image data that has been played back is stored. When a free space is generated in the frame memory 11 (the frame memory area A or B), the digital television set 2 outputs another image-transfer request command to the digital video camera 1. The digital television set 2 continues the slide show by performing the above-described operations until the number of pieces of still image data to be transferred becomes "0".

As described above, in the first embodiment, the HDMI command processing unit 13 of the digital television set 2 and the HDMI command processing unit 23 of the digital video camera 1 that transfer control commands to and from the digital video camera 1 and 2 operate independent of the HDMI input processing unit 12 and the HDMI output processing unit 22 that transfer still image data. In addition, the digital video camera 1 operates in the normal power-consumption mode only in the period after reception of an image-transfer request command from the digital television set 2 until completion of an operation for transferring still image data in accordance with the image-transfer request command. The digital video camera 1 operates in the low power-consumption mode in the period after execution of an operation for transferring still image data in accordance with an image-transfer request command until reception of another image-transfer request command from the digital television set 2.

Thus, the power consumption of the digital video camera 1 in a case where still image data to be used for a slide show is transferred to the digital television set 2 in accordance with the HDMI, in which still image data is transferred while a still image is handled as a moving image, can be reduced compared to a digital video camera of the prior art.

The digital video camera 1 operates in the normal power-consumption mode in the period after reception of an image-transfer request command from the digital television set 2 until completion of an operation for transferring still image data in accordance with the image-transfer request command. Thus, even when the power consumption of the digital video camera 1 is reduced, a delay in a response of the digital video camera 1 to a query from the digital television set 2 (an operation for transferring still image data) is negligible.

In the first embodiment, in step S32 in the flowchart shown in FIG. 4, an example of a case where a certain number of pieces of still image data is read in order from the beginning has been described. However, the present invention is not limited to this. For example, in step S34, if the value indicated by the reading pointer is decremented by "1", a piece of still image data that is immediately preceding the current piece of still image data can be read. If the value indicated by the reading pointer is incremented by "5", the fifth piece of still image data from the current piece of still image data can be read.

In addition, after the list of thumbnail images of a certain number of pieces of still image data stored in the frame memory 11 is displayed on the display unit 15, when one of the thumbnail images is selected in accordance with an operation of the operation unit 16, a piece of still image data corresponding to the selected thumbnail image is displayed.

In addition, in the first embodiment, an example in which the frame memory 11 includes two frame areas (the frame memory areas A and B) has been explained. However, the frame memory 11 may include three or more memory areas.

Second Embodiment

A second embodiment of the present invention will be described. In the first embodiment, the number of pieces of transferred still image data is controlled using the maximum number of pieces of still image data that can be stored in the frame memory 11 (max_maisu) and the number of pieces of still image data to be transferred (maisu). However, in the second embodiment, the number of pieces of transferred still image data is controlled without using the maximum number of pieces of still image data that can be stored in the frame memory 11 and the number of pieces of still image data to be transferred. More specifically, transfer of still image data is performed between the digital video camera 1 and the digital television set 2, for example, by simple handshaking using an REQ signal and an ACK signal. In the second embodiment, even in a case where still image data is transferred by handshaking, some of operations of the HDMI output processing unit 22 that performs processing in accordance with the TMDS are stopped. As described above, the second embodiment is mainly different from the first embodiment in part of processing for transferring image data. Thus, in the description of the second embodiment, the same parts as in the first embodiment described with reference to FIGS. 1 to 6 are represented by the same reference numerals.

An example of a process for storing image data performed by the digital television set 2 will be described with reference to a flowchart shown in FIG. 7. After the digital video camera 1 and the digital television set 2 are connected to each other through the HDMI cable 6, when a user operates the operation units 16 and 26 to issue an instruction to start a slide show, the process represented by the flowchart shown in FIG. 7 starts.

In order to store still image data to be used for a slide show into the frame memory 11, the HDMI command processing unit 13 of the digital television set 2 generates, as a control command, an image-transfer request command, which indicates a request for transfer of still image data, in accordance with an instruction from the CPU 10. The HDMI command processing unit 13 of the digital television set 2 transmits the image-transfer request command, which is generated in accordance with the instruction from the CPU 10, to the digital video camera 1 (the HDMI command processing unit 23) through the HDMI cable 6 (step S201). Although an image-transfer request command used in the first embodiment contains maximum-number-of-pieces-of-allowable-still-image-data information, an image-transfer request command used in the second embodiment does not contain maximum-number-of-pieces-of-allowable-still-image-data information.

In the second embodiment, the command communication step is implemented by the processing of steps S201, S202, and S204. An image-transfer request command is transmitted.

The HDMI command processing unit 13 of the digital television set 2 waits until a transfer response command, which is a response to the image-transfer request command transmitted in step S201, is transmitted from the digital video camera 1 (the HDMI command processing unit 23) (step S202). Although a transfer response command used in the first embodiment contains number-of-pieces-of-still-image-data-to-be-transferred information, a transfer response command used in the second embodiment does not contain number-of-pieces-of-still-image-data-to-be-transferred information.

As noted above, in the second embodiment, the command communication step is also implemented by the processing of step S202.

The HDMI input processing unit 12 of the digital television set 2 receives still image data from the digital video camera 1 and writes the received still image data into the frame memory 11 (step S203). In the second embodiment, the image reception step is implemented by the processing of step S203.

The HDMI command processing unit 13 of the digital television set 2 generates an image-data-reception completion command, which indicates completion of the reception of still image data, in accordance with an instruction from the CPU 10, and transmits the generated image-data-reception completion command to the digital video camera 1 (step S204). As noted above, in the second embodiment, the command communication step is also implemented by the processing of step S204. In addition, in the second embodiment, a reception completion command is implemented using the image-data-reception completion command.

Then, the CPU 10 of the digital television set 2 determines whether a free space for storing still image data exists in the frame memory 11 (the frame memory area A or B) (step S205). If it is determined in step S205 that a free space for storing still image data exists in the frame memory 11 (the frame memory area A or B), the process returns to step S201. Then, the processing of steps S201 to S205 is repeated until no free space exists. If no free space exists in the frame memory 11 (the frame memory area A or B), the process represented by the flowchart shown in FIG. 7 is terminated.

In the second embodiment, a free-space determination unit is implemented using the CPU 10 of the digital television set 2. In addition, a free-space determination step is implemented by the processing of step S205.

As described above, in the second embodiment, transfer of still image data is performed between the digital video camera 1 and the digital television set 2 by handshaking using control commands so that still image data to be used for a slide show is stored into the frame memory 11.

An example of a process for playback (slide show) of still image data performed by the digital television set 2 will be described with reference to a flowchart shown in FIG. 8.

Figure 7:
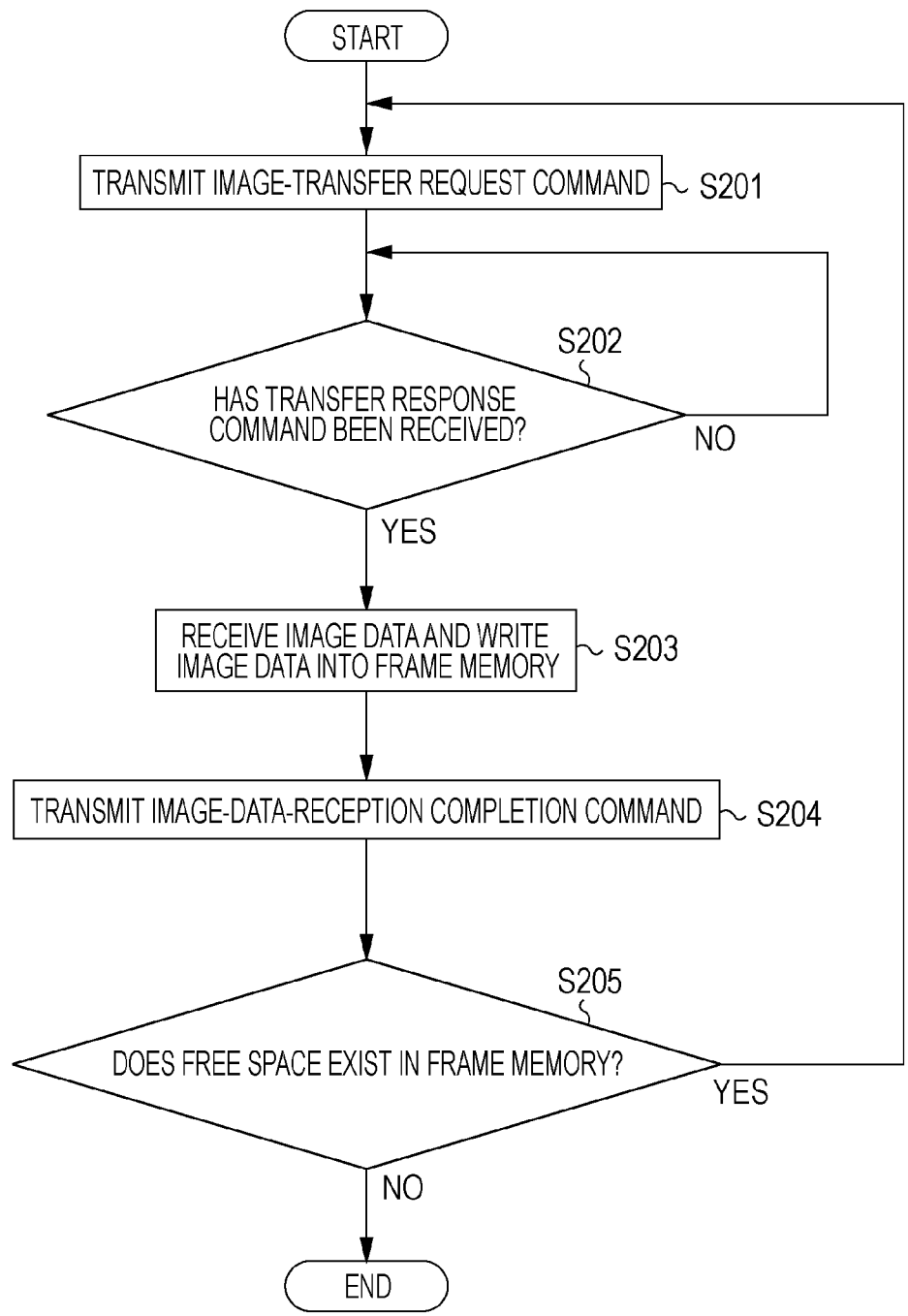
FIG. 7 is a flowchart illustrating an example of a process for storing still image data performed by a digital television set according to a second embodiment of the present invention.
Figure 8:
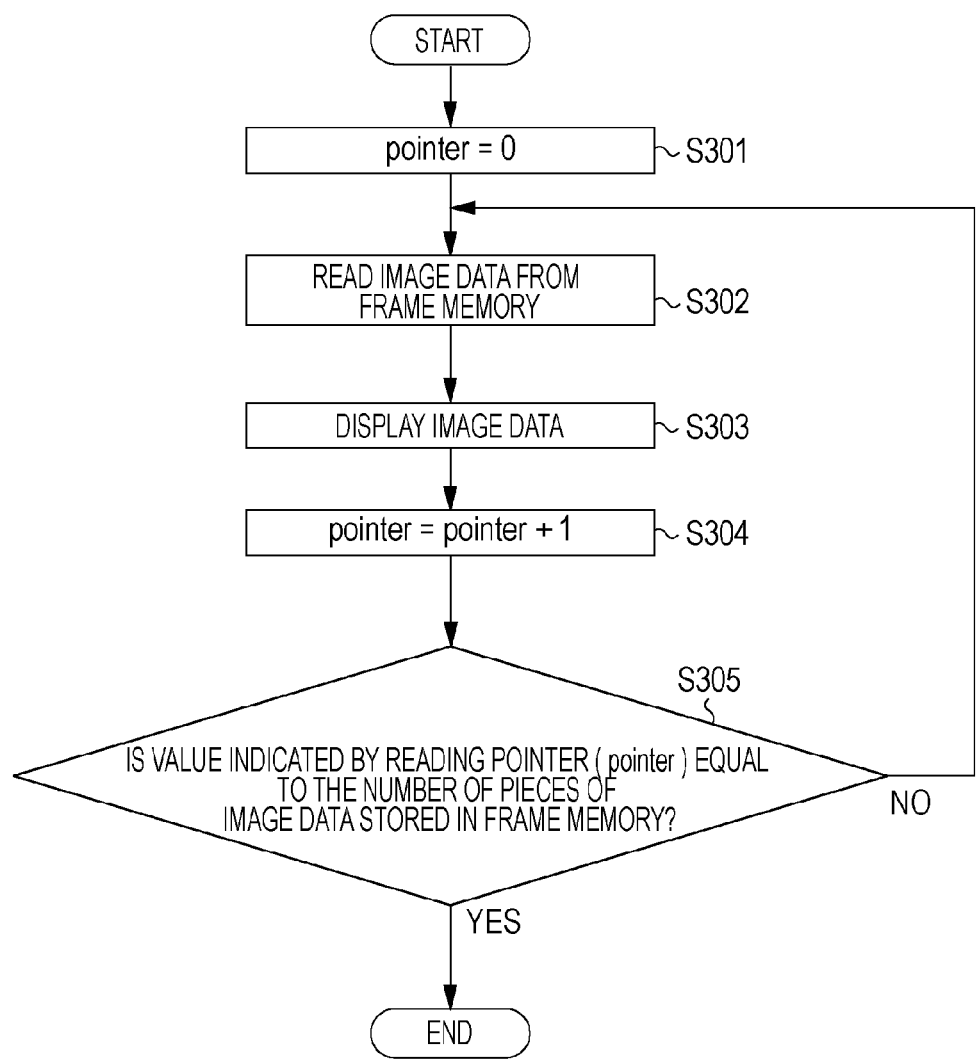
FIG. 8 is a flowchart illustrating an example of a process for playback (slide show) of still image data performed by the digital television set according to the second embodiment.

After the digital video camera 1 and the digital television set 2 are connected to each other through the HDMI cable 6, when still image data is stored into the frame memory 11 in accordance with the flowchart shown in FIG. 7, the process represented by the flowchart shown in FIG. 8 starts.

In order to prepare for reading of still image data from the frame memory 11, the CPU 10 of the digital television set 2 initializes the value indicated by a reading pointer (pointer) to "0" (step S301). The value indicated by the reading pointer is stored, for example, in the RAM 18.

The CPU 10 of the digital television set 2 reads still image data from the frame memory 11 and outputs the read still image data to the output unit 14 (step S302). A read address used for reading still image data from the frame memory 11 is obtained by adding the value indicated by the reading pointer to a base address, as in the first embodiment.

The output unit 14 of the digital television set 2 processes the still image data received in step S302 into a form suitable to be used for a slide show to be provided by the display unit 15, and outputs the processed still image data to the display unit 15. The display unit 15 provides a slide show by displaying the image data output from the output unit 14 (step S303). In the second embodiment, the image display step is implemented by the processing of step S303.

In order to play back still image data to be displayed next, the CPU 10 of the digital television set 2 increments the value indicated by the reading pointer (pointer) by "1" (step S304).

The CPU 10 of the digital television set 2 determines whether the value indicated by the reading pointer is equal to the number of pieces of still image data stored in the frame memory area A or B (step S305). Responsive thereto, the CPU 10 of the digital television set 2 determines whether the image playback process is to be terminated. If it is determined in step S305 that the value indicated by the reading pointer is not equal to the number of pieces of still image data stored in the frame memory area A or B, the process returns to step S302. The processing of steps S302 to S305 is repeated until the value indicated by the reading pointer becomes equal to the number of pieces of still image data stored in the frame memory area A or B. When the value indicated by the reading pointer is equal to the number of pieces of still image data stored in the frame memory area A or B, the process represented by the flowchart shown in FIG. 8 is terminated.

As described above, in the second embodiment, a slide show using still image data stored in the frame memory 11 can be provided in accordance with the process represented by the flowchart shown in FIG. 8.

In a case where a transfer interruption command or a transfer cancellation command for interrupting or canceling the transfer of still image data is received from the digital video camera 1 in the process represented by the flowchart shown in FIG. 7 or 8, the digital television set 2 terminates the process for storing still image data.

An example of a process for transferring still image data performed by the digital video camera 1 will be described with reference to a flowchart shown in FIG. 9.

Figure 9:
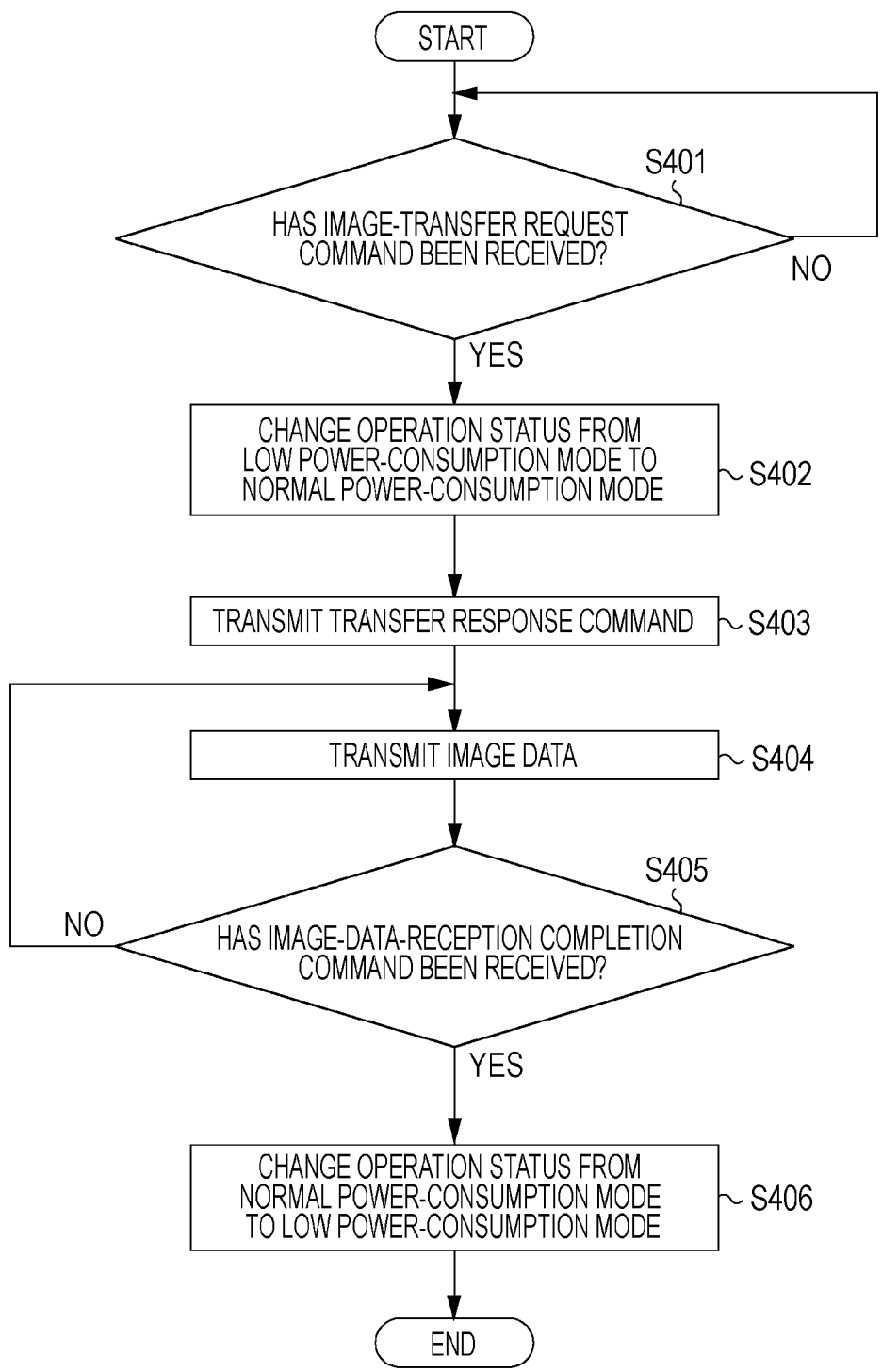
FIG. 9 is a flowchart illustrating an example of a process for transferring still image data performed by a digital video camera according to the second embodiment.

After the digital video camera 1 and the digital television set 2 are connected to each other through the HDMI cable 6, when a user operates the operation units 16 and 26 to issue an instruction to start a slide show, the process represented by the flowchart shown in FIG. 9 starts. In the second embodiment, the digital video camera 1 is in the low power-consumption mode, for example, during the period in which the digital video camera 1 is not transferring still image data, thus reducing the consumption of the battery, as in the first embodiment.

In order to transfer still image data to be used for a slide show, the HDMI command processing unit 23 of the digital video camera 1 waits until an image-transfer request command, which indicates a request for transfer of still image data, is received from the digital television set 2 (step S401). In the second embodiment, the command communication step is implemented by the processing of step S401.

When receiving the image-transfer request command, the CPU 20 of the digital video camera 1 changes the operation status from the low power-consumption mode to the normal power-consumption mode (step S402). The CPU 20 of the digital video camera 1 starts at least some of operations of the HDMI output processing unit 22 that performs processing in accordance with the TMDS. In the second embodiment, the operation resumption step is implemented by the processing of step S402.

After starting of the HDMI output processing unit 22 and preparation for transfer of still image data are completed, the HDMI command processing unit 23 of the digital video camera 1 generates a transfer response command, which is a response to the image-transfer request command, in accordance with an instruction from the CPU 20 of the digital video camera 1. The HDMI command processing unit 23 of the digital video camera 1 transmits the generated transfer response command to the digital television set 2 (step S403). In the second embodiment, the command communication step is implemented by the processing of step S403.

The CPU 20 of the digital video camera 1 reads from the memory card 24 or the frame memory 21 still image data to be transferred to the digital television set 2, for example, in accordance with an operation of the operation unit 26. The HDMI output processing unit 22 of the digital video camera 1 enters the still image data, which is read by the CPU 20, in the HDMI frame format, and transfers the still image data to the digital television set 2 (step S404) In the second embodiment, the image transmission step is implemented by the processing of step S404.

The HDMI command processing unit 23 of the digital video camera 1 determines whether an image-data-reception completion command has been received from the digital television set 2 (step S405). If it is determined in step S405 that an image-data-reception completion command has not been received from the digital television set 2, the processing of steps S404 and S405 is repeated until an image-data-reception completion command is received. When an image-data-reception completion command is received from the digital television set 2, the CPU 20 of the digital video camera 1 changes the operation status from the normal power-consumption mode to the low power-consumption mode (step S406). The CPU 20 of the digital video camera 1 stops at least some of operations of the HDMI output processing unit 22 that performs processing in accordance with the TMDS. Then, the process represented by the flowchart shown in FIG. 9 is terminated. Subsequently, the digital video camera 1 keeps the low power-consumption mode until the digital video camera 1 receives the next image-transfer request command from the digital television set 2.

In the second embodiment, the command communication step and the determination step are implemented by the processing of step S405. In addition, the operation stopping step is implemented by the processing of step S406.

As described above, in the second embodiment, even in a case where handshaking between the digital video camera 1 and the digital television set 2 is performed using control commands, the digital video camera 1 can be set to the low power-consumption mode during the period in which the digital video camera 1 is not transferring still image data. Thus, transfer of still image data can be achieved while the power consumption of the battery is reduced. In addition, in the second embodiment, control of starting and stopping of the some of operations of the HDMI output processing unit 22 that performs processing in accordance with the TMDS can be performed in accordance with an image-transfer request command transmitted from the digital television set 2, as in the first embodiment.

In addition, in the second embodiment, in order to interrupt or cancel the transfer of still image data in the process represented by the flowchart shown in FIG. 9, the HDMI command processing unit 23 of the digital video camera 1 generates a transfer interruption command or a transfer cancellation command, as in the first embodiment. The HDMI command processing unit 23 of the digital video camera 1 transmits the generated transfer interruption command or transfer cancellation command to the digital television set 2. Accordingly, the digital television set 2 is informed of the interruption or cancellation of the transfer of still image data.

Accordingly, a slide show can be provided while the power consumption of the digital video camera 1 is reduced compared with a digital video camera of the prior art.

Figure 10:
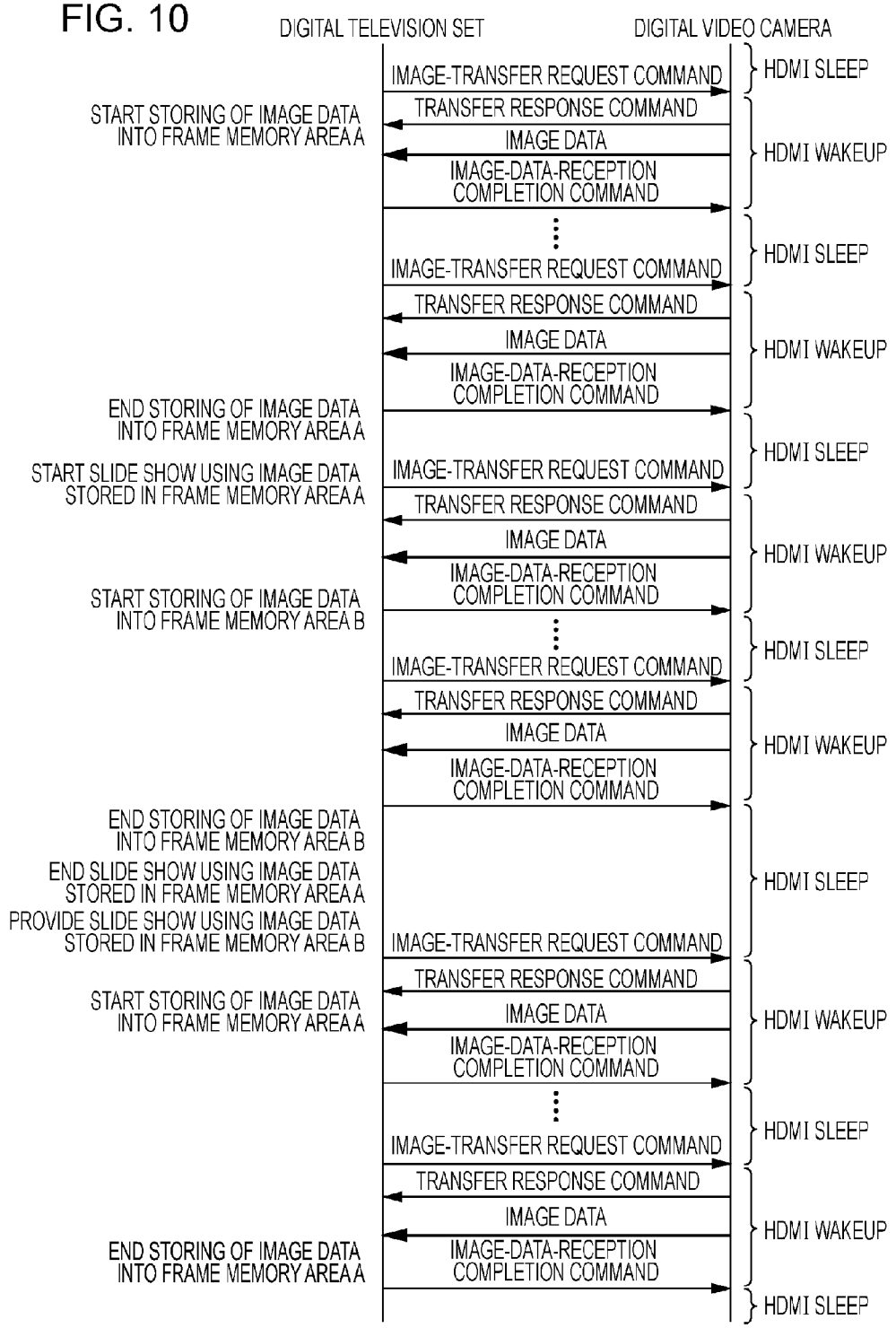
FIG. 10 illustrates an example of operations of the digital television set and operations of the digital video camera according to the second embodiment when a slide show is provided.

FIG. 10 illustrates an example of operations of the digital television set 2 and operations of the digital video camera 1 when a slide show is provided. The operations are performed in order from the top to the bottom of FIG. 10, as in FIG. 6. An "HDMI wakeup" state indicates a state in the normal power-consumption mode. An "HDMI sleep" state indicates a state in the low power-consumption mode.

Referring to FIG. 10, the digital television set 2 transmits an image-transfer request command to the digital video camera 1.

When receiving the image-transfer request command from the digital television set 2, the digital video camera 1 changes the operation status from the low power-consumption mode to the normal power-consumption mode and prepares for transfer of still image data. More specifically, the digital video camera 1 performs processing, such as starting some of operations of the HDMI output processing unit 22 that performs processing in accordance with the TMDS. After the preparation for transfer of still image data is completed, the digital video camera 1 transmits a transfer response command to the digital television set 2.

The digital video camera 1 transfers still image data (for example, a piece of still image data) to the digital television set 2. Still image data to be transferred is stored, for example, in the frame memory 21 or the memory card 24.

After receiving the still image data, the digital television set 2 stores the still image data into the frame memory 11. Then, the digital television set 2 transmits an image-data-reception completion command, which indicates completion of the reception of still image data, to the digital video camera 1, and transfer of still image data is stopped. The digital video camera 1 receives the image-data-reception completion command. Then, the digital video camera 1 changes the operation status from the normal power-consumption mode to the low power-consumption mode, and stops at least some of operations of the HDMI output processing unit 22 that performs processing in accordance with the TMDS. The digital video camera 1 keeps the low power-consumption mode until another image-transfer request command is transmitted from the digital television set 2.

The above-described operations are repeated. For example, as many pieces of still image data as possible within the range not exceeding the upper limit of the storage capacity of the frame memory area A are stored in the frame memory area A. Then, after storing of still image data into the frame memory area A is completed, the digital television set 2 starts a slide show by playing back the still image data stored in the frame memory area A.

Storing of still image data into the frame memory area B is performed similarly to the storing of still image data into the frame memory area A. After playback of the still image data stored in the frame memory area A is completed, a slide show using the still image data stored in the frame memory area B is provided.

Storing of still image data into the frame memory area A or B is performed when a free space is generated in the frame memory area A or B. As described above, the state in which a free space exists in the frame memory area A or B represents a state in which still image data is not stored or a state in which only still image data that has been played back is stored. When a free space is generated in the frame memory area A or B, the digital television set 2 transmits an image-transfer request command to the digital video camera 1.

The digital television set 2 is capable of continuing to provide a slide show by performing the above-described operations.

As described above, in the second embodiment, the digital video camera 1 and the digital television set 2 perform handshaking for each piece of still image data, so that the digital video camera 1 can transfer still image data to the digital television set 2. Even in a case where still image data is transferred as described above, the digital video camera 1 operates in the low power-consumption mode in the period after execution of an operation for transferring still image data in accordance with an image-transfer request command until reception of another image-transfer request command from the digital television set 2. Thus, even in a case where still image data is transferred from the digital video camera 1 to the digital television set 2 by handshaking between the digital video camera 1 and the digital television set 2 for each piece of still image data, advantages similar to those attained in the first embodiment are attained.

Although a determination as to whether storing of still image data is to be terminated is performed on the basis of the storage capacity (size) of the frame memory 11 of the digital television set 2 in the second embodiment, the present invention is not limited to this. For example, when still image data stored in the frame memory area A or B reaches a predetermined amount, storing of still image data may be terminated.

In addition, although the digital video camera 1 starts transfer of still image data after transmitting a transfer response command in the second embodiment, the present invention is not limited to this. For example, the digital video camera 1 may transfer to the digital television set 2 still image data together with a transfer response command.

In addition, although the determination as to whether the value indicated by the reading pointer is equal to the number of pieces of still image data stored in the frame memory area A or B is performed in step S305 of FIG. 8 in the second embodiment, the present invention is not limited to this. For example, a determination as to whether the amount of stored still image data based on the value indicated by the reading pointer becomes the closest to the maximum storage capacity of the frame memory area A or B within the range not exceeding the upper limit of the storage capacity of the frame memory area A or B may be performed.

Third Embodiment

A third embodiment of the present invention will be described. Although the digital television set 2 transmits an image-transfer request command to the digital video camera 1 in the second embodiment, the digital video camera 1 transmits an image-transfer request command to the digital television set 2 in the third embodiment. The third embodiment is different from the second embodiment in part of processing performed for an image-transfer request command. In the description of the third embodiment, the same parts as in the first and second embodiments described with reference to FIGS. 1 to 10 are represented by the same reference numerals.

Figure 11:
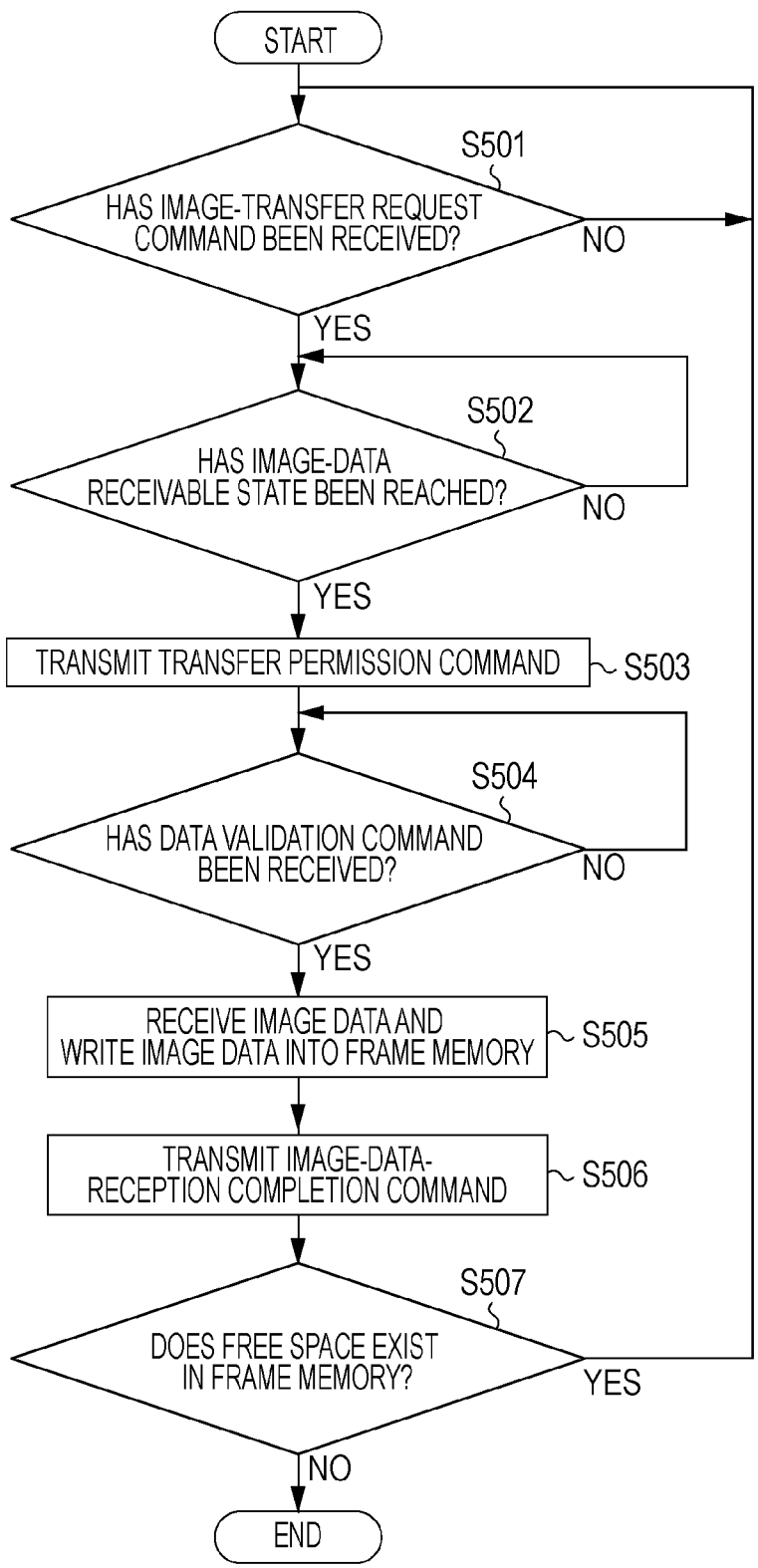
FIG. 11 is a flowchart illustrating an example of a process for storing still image data performed by a digital television set according to a third embodiment of the present invention.

An example of a process for storing still image data performed by the digital television set 2 will be described with reference to a flowchart shown in FIG. 11. After the digital video camera 1 and the digital television set 2 are connected to each other through the HDMI cable 6, when a user operates the operation units 16 and 26 to issue an instruction to start a slide show, the process represented by the flowchart shown in FIG. 11 starts.

In order to store still image data into the frame memory 11, the HDMI command processing unit 13 of the digital television set 2 waits until an image-transfer request command is received from the digital video camera 1 (step S501). In the third embodiment, the command communication step is implemented by the processing of step S501. In addition, in the third embodiment, the image request command is implemented using the image-transfer request command.

When receiving the image-transfer request command from the digital video camera 1, the CPU 10 of the digital television set 2 waits until the digital television set 2 enters a data-receivable state in which the digital television set 2 is capable of receiving still image data (step S502). When the digital television set 2 enters the data-receivable state, the HDMI command processing unit 13 of the digital television set 2 generates a transfer permission command in accordance with an instruction from the CPU 10 and transmits the generated transfer permission command to the digital video camera 1 (step S503). In the third embodiment, the command communication step is implemented by the processing of step S503. In addition, in the third embodiment, the transmission command is implemented using the transfer permission command.

The HDMI command processing unit 13 of the digital television set 2 waits until a data validation command is received from the digital video camera 1 (step S504).

When receiving the data validation command from the digital video camera 1, the HDMI input processing unit 12 of the digital television set 2 receives still image data from the digital video camera 1 and writes the received still image data into the frame memory 11 (step S505). In the third embodiment, the image reception step is implemented by the processing of step S505.

The HDMI command processing unit 13 of the digital television set 2 generates an image-data-reception completion command, which indicates completion of the reception of still image data, in accordance with an instruction from the CPU 10, and transmits the generated image-data-reception completion command to the digital video camera 1 (step S506). In the third embodiment, the command communication step is implemented by the processing of step S506. In addition, in the third embodiment, the reception completion command is implemented using the image-data-reception completion command.

Then, the CPU 10 of the digital television set 2 determines whether a free space for storing still image data exists in the frame memory 11 (the frame memory area A or B) (step S507). If it is determined in step S507 that a free space for storing still image data exists in the frame memory 11 (the frame memory area A or B), the process returns to step S501. Then, the processing of steps S501 to S507 is repeated until no free space exists. If no free space exists in the frame memory 11 (the frame memory area A or B), the process represented by the flowchart shown in FIG. 11 is terminated.

As described above, even in a case where the digital video camera 1 transmits an image-transfer request command, still image data can be transferred and stored by handshaking between the digital video camera 1 and the digital television set 2 using control commands, as in the second embodiment.

An example of a process for transferring still image data performed by the digital video camera 1 will be described with reference to a flowchart shown in FIG. 12.

Figure 12:
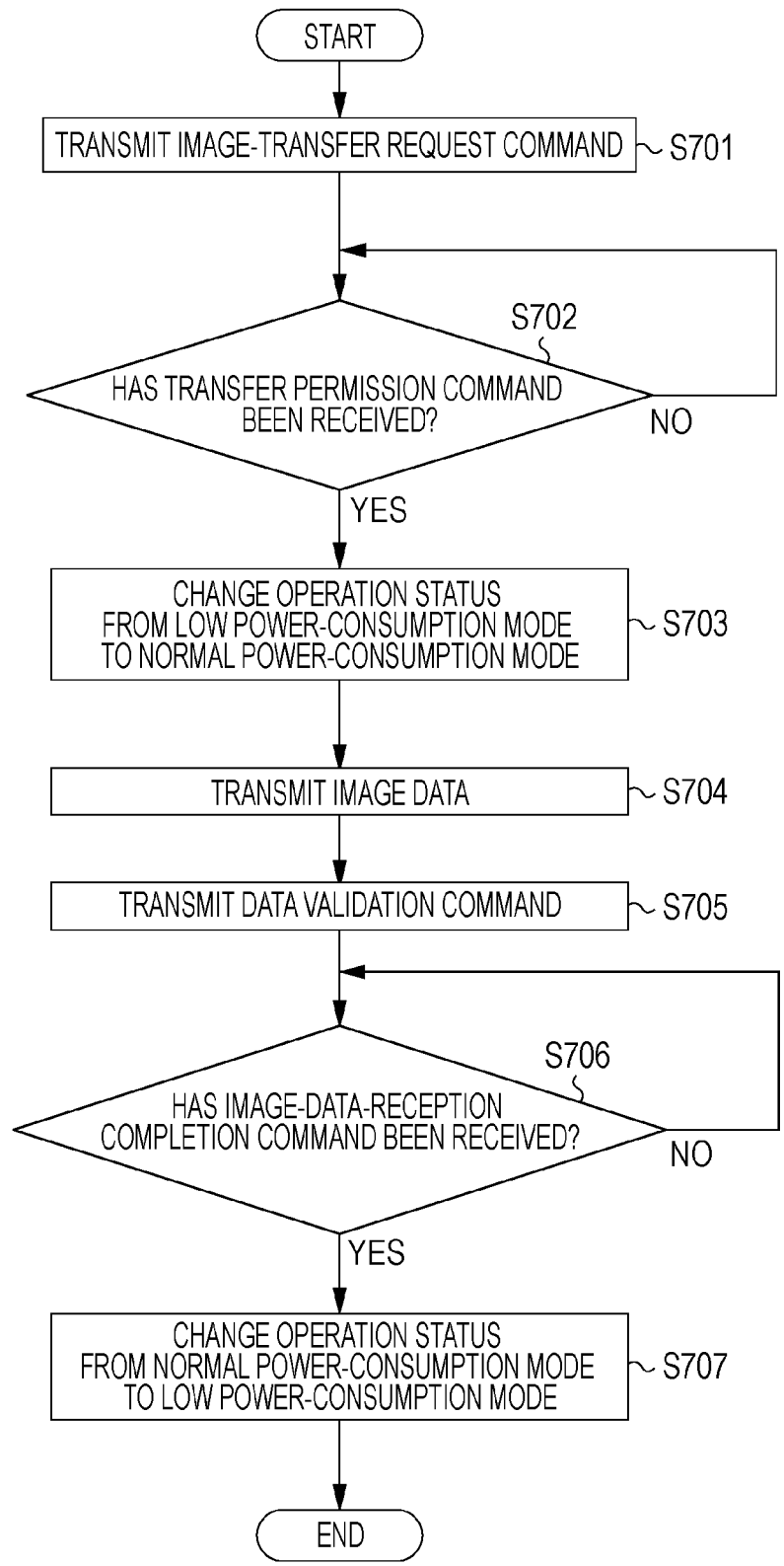
FIG. 12 is a flowchart illustrating an example of a process for transferring still image data performed by a digital video camera according to the third embodiment.

After the digital video camera 1 and the digital television set 2 are connected to each other through the HDMI cable 6, when a user operates the operation units 16 and 26 to issue an instruction to start a slide show, the process represented by the flowchart shown in FIG. 12 starts. In the third embodiment, the digital video camera 1 is in the low power-consumption mode, for example, during the period in which the digital video camera 1 is not transferring still image data, thus reducing the power consumption of the battery, as in the first and second embodiments.

The HDMI command processing unit 23 of the digital video camera 1 generates an image-transfer request command in accordance with an instruction from the CPU 20, and transmits the generated image-transfer request command to the digital television set 2 (step S701). In the third embodiment, the command communication step is implemented by the processing of step S701.

The HDMI command processing unit 23 of the digital video camera 1 waits until a transfer permission command is received from the digital television set 2 (step S702). As described above, the digital video camera 1 stops at least some of operations of the HDMI output processing unit 22 that performs processing in accordance with the TMDS during the period in which the digital video camera 1 is not transferring image data, and is in the low power-consumption mode. In the third embodiment, the command communication step is implemented by the processing of step S702.

When receiving the transfer permission command from the digital television set 2, the CPU 20 of the digital video camera 1 changes the operation status from the low power-consumption mode to the normal power-consumption mode (step S703). The CPU 20 of the digital video camera 1 starts at least some of operations of the HDMI output processing unit 22 that performs processing in accordance with the TMDS. In the third embodiment, the operation resumption step is implemented by the processing of step S701.

After starting of the HDMI output processing unit 22 and preparation for the transfer of still image data are completed, the CPU 20 of the digital video camera 1 reads from the memory card 24 or the frame memory 21 still image data to be transferred to the digital television set 2. The HDMI output processing unit 22 of the digital video camera 1 enters the still image data, which is read by the CPU 20, in the HDMI frame format, and transfers the still image data to the digital television set 2 (step S704). Still image data are sequentially transferred until the digital video camera 1 receives an image-data-reception completion command from the digital television set 2 in step S706, which will be described below. In the third embodiment, the image transmission step is implemented by the processing of step S704.

After the operation status enters the normal power-consumption mode and the digital video camera 1 becomes capable of transferring still image data, the HDMI command processing unit 23 of the digital video camera 1 generates a data validation command in accordance with an instruction from the CPU 20. The data validation command is used for informing the digital television set 2 that still image data is being output. The HDMI command processing unit 23 of the digital video camera 1 transmits the generated data validation command to the digital television set 2 (step S705).

The HDMI command processing unit 23 of the digital video camera 1 waits until an image-data-reception completion command is received from the digital television set 2 (step S706). When receiving the image-data-reception completion command from the digital television set 2, the CPU 20 of the digital video camera 1 changes the operation status from the normal power-consumption mode the low power-consumption mode (step S707). The CPU 20 of the digital video camera 1 stops at least some of operations of the HDMI output processing unit 22 that performs processing in accordance with the TMDS. Then, the process represented by the flowchart shown in FIG. 12 is terminated. Subsequently, the digital video camera 1 keeps the low power-consumption mode until the digital video camera 1 receives a transfer permission command from the digital television set 2. In the third embodiment, the command communication step and the determination step are implemented by the processing of step S706, and the operation stopping step is implemented by the processing of step S707.

As described above, even in a case where the digital video camera 1 requests transfer of still image data, the digital video camera 1 is capable of being in the low power-consumption mode during the period in which the digital video camera 1 is not transferring still image data, as in the second embodiment. Thus, even in a case where the digital video camera 1 requests transfer of still image data, still image data can be transferred while the power consumption of the battery is reduced.

Since an example of the process for transferring still image data performed by the digital video camera 1 in the third embodiment is the same as in the second embodiment, the description of the process will be omitted (see FIG. 9).

Figure 13:
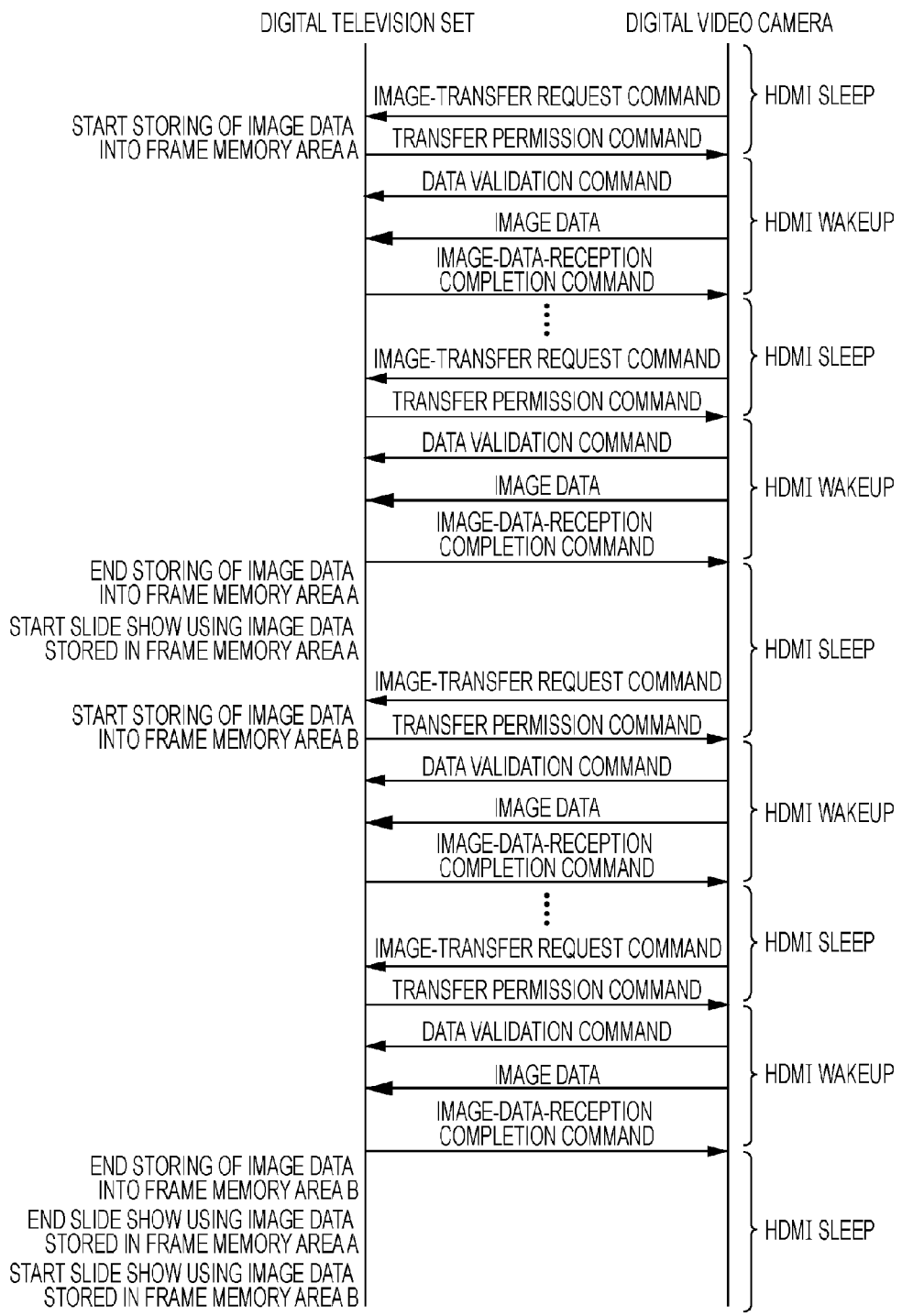
FIG. 13 illustrates an example of operations of the digital television set and operations of the digital video camera according to the third embodiment when a slide show is provided.

FIG. 13 illustrates an example of operations of the digital television set 2 and operations of the digital video camera 1 performed when a slide show is provided. As in FIGS. 6 and 10, the operations are performed in order from the top to the bottom of FIG. 13. An "HDMI wakeup" state indicates a state in the normal power-consumption mode. An "HDMI sleep" state indicates a state in the low power-consumption mode.

Referring to FIG. 13, the digital video camera 1 transmits an image-transfer request command to the digital television set 2.

When receiving the image-transfer request command, the digital television set 2 transmits a transfer permission command to the digital video camera 1.

When receiving the transfer permission command from the digital television set 2, the digital video camera 1 changes the operation status from the low power-consumption mode to the normal power-consumption mode and prepares for transfer of still image data. More specifically, the digital video camera 1 performs processing, such as starting some of operations of the HDMI output processing unit 22 that performs processing in accordance with the TMDS. The digital video camera 1 transmits a data validation command to the digital television set 2.

After the preparation for transfer of still image data is completed, the digital video camera 1 transfers still image data (for example, a piece of still image data) to the digital television set 2. Still image data to be transferred is stored in the frame memory 21 or the memory card 24. Still image data are sequentially transferred until the digital video camera 1 receives an image-data-reception completion command from the digital television set 2.

After receiving the data validation command, the digital television set 2 receives still image data and stores the received still image data into the frame memory 11. Then, the digital television set 2 transmits an image-data-reception completion command, which indicates completion of the reception of still image data, to the digital video camera 1. Then, transfer of still image data is stopped. When receiving the image-data-reception completion command, the digital video camera 1 changes the operation status from the normal power-consumption mode to the low power-consumption mode and stops at least some of operations of the HDMI output processing unit 22 that performs processing in accordance with the TMDS. The digital video camera 1 keeps the low power-consumption mode until a transfer permission command is transmitted from the digital television set 2.

The above-described operations are repeated. For example, as many pieces of still image data as possible within the range not exceeding the upper limit of the storage capacity of the frame memory area A are stored in the frame memory area A. Then, after storing of still image data into the frame memory area A is completed, the digital television set 2 starts a slide show by playing back the still image data stored in the frame memory area A.

Storing of still image data into the frame memory area B is performed similarly to the storing of still image data into the frame memory area A. After playback of the still image data stored in the frame memory area A is completed, a slide show using the still image data stored in the frame memory area B is provided.

The digital video camera 1 periodically transmits an image-transfer request command to the digital television set 2. Storing of still image data into the frame memory area A or B is performed when a free space is generated in the frame memory area A or B. As described above, the state in which a free space exists in the frame memory area A or B represents a state in which still image data is not stored or a state in which only still image data that has been played back is stored.

The digital television set 2 is capable of continuing to provide a slide show by performing the above-described operations.

As described above, in the third embodiment, even in a case where the digital video camera 1 transmits an image-transfer request command to the digital television set 2, each piece of still image data can be transferred from the digital video camera 1 to the digital television set 2 by handshaking. In addition, even in a case where still image data is transferred as described above, the digital video camera 1 operates in the low power-consumption mode during the period after the digital video camera 1 performs an operation for transferring still image data in accordance with a transfer permission command until another transfer permission command is transmitted from the digital television set 2. Thus, advantages similar to those attained in the first and second embodiments are attained.

Although the digital video camera 1 starts transfer of still image data after transferring a data validation command, the present invention is not limited to this. For example, the digital video camera 1 may transfer to the digital television set 2 still image data together with a data validation command.

In addition, although, as in the second embodiment, the determination as to whether storing of image data is to be terminated is performed on the basis of the storage capacity (size) of the frame memory 11 of the digital television set 2 in the third embodiment, the present invention is not limited to this. For example, when still image data stored in the frame memory area A or B reaches a predetermined amount, storing of still image data may be terminated.

According to embodiments of the present invention, in the case of storing still image data in a moving image format and outputting the still image data to an image display apparatus, the power consumption of an apparatus that outputs the still image data can be reduced.

Although the above-described embodiments have been explained using a digital video camera, the same advantages can be achieved when a digital camera is used.

Other Embodiments

Units constituting an image pickup apparatus, an image display apparatus, and an image display system and steps constituting an image processing method according to an embodiment of the present invention are implemented when a program stored in a RAM or a ROM of a computer is executed. The program and a computer-readable recording medium on which the program is recorded fall within the scope of the present invention.

The present invention may be embodied, for example, as a system, an apparatus, a method, a program, a storage medium, or the like. For example, the present invention may be applied to a system including a plurality of apparatuses or to an apparatus including a single device.

According to aspects of the present invention, software programs (programs corresponding to any of the flowcharts shown in FIGS. 3 to 5, 7 to 9, 11, and 12 or equivalents thereto) attaining functions of the foregoing embodiments are supplied to a system or an apparatus directly or by remote control. The functions of the foregoing embodiments may be attained when a computer of the system or the apparatus reads and executes a supplied program code. A machine readable medium embodying a software program for performing one or more embodiment of a process in accordance with the present invention, the software program capable of causing the machine to execute the program and thereby perform the process, is included in the present invention.

Thus, in order to implement functional processing of an aspect of the present invention, a program code itself installed into the computer also implements the present invention. A computer program itself for attaining the functional processing of an aspect of the present invention falls within the scope of the present invention.

In this case, the computer program may be of any type, such as an object code, a program to be executed by an interpreter, or script data to be supplied to an operating system (OS), as long as it has a function of a program.

As a recording medium for supplying a program, for example, a floppy (registered trademark) disk, a hard disk, an optical disc, a magneto-optical disk (MO), a compact disc read-only memory (CD-ROM), a compact disc recordable (CD-R), a compact disc rewritable (CD-RW), or the like is available. In addition, a magnetic tape, a non-volatile memory card, a ROM, or a digital versatile disc (DVD) (including a DVD-ROM and a DVD-R) is available.

In addition, the program may be supplied by connecting to a homepage on the Internet using a browser of a client computer and by downloading a computer program according to an aspect of the present invention or a compressed file having an automatic installation function from the homepage to a storage medium, such as a hard disk.

In addition, the program may be supplied by dividing the program code constituting the program according to an aspect of the present invention into a plurality of files and by downloading the divided files from different homepages. A World Wide Web (WWW) server for allowing a plurality of users to download a program file for attaining function processing of an aspect of the present invention on a computer is also included in the present invention.

In addition, a program according to an aspect of the present invention may be encoded and stored in a storage medium, such as a CD-ROM, and may be distributed to users. Only a user who satisfies predetermined conditions may be able to download key information for decoding the encoded program from a homepage via the Internet. In addition, the encoded program can be executed by using the downloaded key information and can be installed to a computer.

In addition, the functions of the foregoing embodiments can be attained not only by executing the read program by the computer but also by performing part or all of the actual processing by an OS or the like running on the computer on the basis of instructions of the program.

Furthermore, the program code read from the recording medium may be written to a memory arranged in a function expansion board inserted into the computer or a function expansion unit connected to the computer. The functions of the foregoing embodiments can also be attained by performing part or all of the actual processing by the CPU or the like arranged in the function expansion board or the function expansion unit on the basis of instructions of the program code.

The foregoing embodiments are merely exemplary examples for implementing the present invention. The technical scope of the present invention should not be limitedly understood by the foregoing embodiments. Various changes and modifications may be made to the present invention without departing from the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-020083 filed Jan. 30, 2007, which is hereby incorporated by reference herein in its entirety.

What is claimed is:

1. An image pickup apparatus comprising:
a command communication unit that receives a command from an image display apparatus in accordance with CEC(consumer electronics control) of HDMI(High-Definition Multimedia Interface);
an image transmission unit that transmits image data based on the HDMI to the image display apparatus in accordance with TMDS(Transition Minimized Differential Signaling) of the HDMI; and
a control unit that controls the image transmission unit to transmit image data based on the HDMI to the image display apparatus if a first command is received from the image display apparatus by the command communication unit,
wherein the control unit stops an operation of the image transmission unit without stopping an operation of the command communication unit if image data based on the HDMI is transmitted to the image display apparatus by the image transmission unit and a second command is received from the image display apparatus by the command communication unit,
wherein the first command includes a command for requesting the image pickup apparatus to transmit image data to the image display apparatus, and
wherein the second command includes a command for indicating that the image display apparatus received image data transmitted from the image pickup apparatus.

2. The image pickup apparatus according to claim 1, wherein the control unit controls the command communication unit to transmit a third command to the display apparatus if a preparation process for transmitting image data based on the HDMI to the image display apparatus is completed,
wherein the third command includes a command for indicating that the image transmission unit transmits image data based on the HDMI to the image display apparatus.

3. The image pickup apparatus according to claim 1, wherein image data based on the HDMI is still image data.

4. The image pickup apparatus according to claim 1, wherein the command communication unit can receive a command transmitted from the image display apparatus in accordance with the CEC and transmit a command for controlling the image display apparatus to the image display apparatus in accordance with the CEC, even if the operation of the image transmission unit is stopped.

5. The image pickup apparatus according to claim 1, wherein the control unit controls the image transmission unit to transmit no image data based on the HDMI until receiving the first command from the image display apparatus if the operation of the image transmission unit is stopped.

6. A method for controlling an image pickup apparatus including a command communication unit that receives a command from an image display apparatus in accordance with CEC(consumer electronics control) of HDMI(High-Definition Multimedia Interface), and an image transmission unit that transmits image data based on the HDMI to the image display apparatus in accordance with TMDS (Transition Minimized Differential Signaling) of the HDMI, the method comprising:
controlling the image transmission unit to transmit image data based on the HDMI to the image display apparatus if a first command is received from the image display apparatus by the command communication unit,
stopping an operation of the image transmission unit without stopping an operation of the command communication unit if image data based on the HDMI is transmitted to the image display apparatus by the image transmission unit and a second command is received from the image display apparatus by the command communication unit,
wherein the first command includes a command for requesting the image pickup apparatus to transmit image data to the image display apparatus, and wherein the second command includes a command for indicating that the image display apparatus received image data transmitted from the image pickup apparatus.

7. The method according to claim 6, comprising:
controlling the command communication unit to transmit a third command to the image display apparatus if a preparation process for transmitting image data based on the HDMI to the image display apparatus is completed,
wherein the third command includes a command for indicating that the image transmission unit transmits image data based on the HDMI to the image display apparatus.

8. The method according to claim 6, wherein image data based on the HDMI is still image data.

9. A non-transitory computer-readable recording medium storing a program executed by a computer, wherein the program for using the computer to perform a method for controlling an image pickup apparatus including a command communication unit that receives a command from t-he--an image display apparatus in accordance with CEC(Consumer Electronics Control) of t-he-HDMI(High-Definition Multimedia Interface), and an image transmission unit that transmits image data based on the HDMI to the image display apparatus in accordance with TMDS(Transition Minimized Differential Signaling) of the HDMI, the method comprising:
controlling the image transmission unit to transmit image data based on the HDMI to the image display apparatus if a first command is received from the image display apparatus by the command communication unit,
stopping an operation of the image transmission unit without stopping an operation of the command communication unit if image data based on the HDMI is transmitted to the image display apparatus by the image transmission unit and a second command is received from the image display apparatus by the command communication unit,
wherein the first command includes a command for requesting the image pickup apparatus to transmit image data to the image display apparatus, and
wherein the second command includes a command for indicating that the image display apparatus received image data transmitted from the image pickup apparatus.

10. An image pickup apparatus comprising:
a command communication unit that receives a command from an image display apparatus in accordance with CEC(Consumer Electronics Control) of HDMI(High-Definition Multimedia Interface);
an image transmission unit that transmits image data based on the HDMI to the image display apparatus in accordance with TMDS (Transition Minimized Differential Signaling) of the HDMI; and
a control unit that changes an operation status of the image pickup apparatus to a first mode if a first command is received from the image display apparatus by the command communication unit and the operation status of the image pickup apparatus is not the first mode,
wherein the control unit changes the operation status of image pickup apparatus to a second mode if a second command is received from the image display apparatus by the command communication unit and the operation status of the image pickup apparatus is the first mode,
wherein the first mode is a mode used for stopping an operation of the image transmission unit without stopping an operation of the command communication unit,
wherein the second mode is a mode used for not stopping an operation of the image transmission unit and an operation of the command communication unit,
wherein the first command includes a command for requesting the image pickup apparatus to transmit image data to the image display apparatus, and
wherein the second command includes a command for indicating that the image display apparatus received image data transmitted from the image pickup apparatus.

11. The image pickup apparatus according to claim 10, wherein the control unit controls the command communication unit to transmit a third command to the image display apparatus if the operation mode of the image pickup apparatus is changed from the second mode to the first mode,
wherein the third command includes a command indicating that the image transmission unit transmits image data based on the HDMI to the image display apparatus.

12. The image pickup apparatus according to claim 10, wherein image data based on the HDMI is still image data.

13. The image pickup apparatus according to claim 10, wherein the second mode is a mode in which a power consumption is lower than the first mode.

14. The image pickup apparatus according to claim 10, wherein the command communication unit can receive a command transmitted from the image display apparatus in accordance with the CEC and transmit a command for controlling the image display apparatus to the image display apparatus in accordance with the CEC, even if the operation status of the image pickup apparatus is the first mode.

15. The image pickup apparatus according to claim 10, wherein the control unit does not change the operation status of the image pickup apparatus to the second mode until receiving the first command from the image display apparatus if the operation status of the image pickup apparatus is the first mode.

16. A method for controlling an image pickup apparatus, the image pickup apparatus including a command communication unit that receives a command from an image display apparatus in accordance with CEC(Consumer Electronics Control) of HDMI(High-Definition Multimedia Interface), and an image transmission unit that transmits image data based on the HDMI to the image display apparatus in accordance with TMDS (Transition Minimized Differential Signaling) of the HDMI, the method comprising:
changing an operation status of the image pickup apparatus to a first mode if a first command is received from the image display apparatus by the command communication unit and the operation status of the image pickup apparatus is not the first mode,
changing the operation status of image pickup apparatus to a second mode if a second command is received from the image display apparatus by the command communication unit and the operation status of the image pickup apparatus is the first mode,
wherein the first mode is a mode used for stopping an operation of the image transmission unit without stopping an operation of the command communication unit,
wherein the second mode is a mode used for not stopping an operation of the image transmission unit and an operation of the command communication unit
wherein the first command includes a command for requesting the image pickup apparatus to transmit image data to the image display apparatus, and wherein the second command includes a command for indicating that the image display apparatus received image data transmitted from the image pickup apparatus.

17. A non-transitory computer-readable recording medium storing a program executed by a computer, wherein the program for using the computer to perform a method for controlling an image pickup apparatus, the image pickup apparatus including a command communication unit that receives a command from an image display apparatus in accordance with CEC(Consumer Electronics Control) of HDMI(High-Definition Multimedia Interface), and an image transmission unit that transmits image data based on the HDMI to the image display apparatus in accordance with TMDS(Transition Minimized Differential Signaling) of the HDMI, the method comprising:

changing an operation status of the image pickup apparatus to a first mode if a first command is received from the image display apparatus by the command communication unit and the operation status of the image pickup apparatus is not the first mode, changing the operation status of image pickup apparatus to a second mode if a second command is received from the image display apparatus by the command communication unit and the operation status of the image pickup apparatus is the first mode, wherein the first mode is a mode used for stopping an operation of the image transmission unit without stopping an operation of the command communication unit, wherein the second mode is a mode used for not stopping an operation of the image transmission unit and an operation of the command communication unit, wherein the first command includes a command for requesting the image pickup apparatus to transmit image data to the image display apparatus, and wherein the second command includes a command indicating that the image display apparatus received image data transmitted from the image pickup apparatus.

18. An image pickup apparatus comprising:

a command communication unit that receives a command from an image display apparatus in accordance with CEC(consumer electronics control) of HDMI(High-Definition Multimedia Interface);

an image transmission unit that transmits image data based on the HDMI to the image display apparatus in accordance with TMDS (Transition Minimized Differential Signaling) of the HDMI; and a control unit that controls the image transmission unit to transmit image data based on the HDMI to the image display apparatus if a predetermined command is received from the image display apparatus by the command communication unit, wherein the control unit stops an operation of the image transmission unit without stopping an operation of the command communication unit if a number of image data that the image transmission unit transmitted to the image display apparatus is equal to or more than a predetermined number, wherein the predetermined command includes a command for requesting the image pickup apparatus to transmit image data to the image display apparatus.

19. The image pickup apparatus according to claim 18, wherein the control unit does not stop the operation of the image transmission unit and the operation of the command communication unit if the number is less than the predetermined number.

20. The image pickup apparatus according to claim 18, wherein image data based on the HDMI is still image data.

21. The image pickup apparatus according to claim 18, wherein the predetermined number is set based on information included in the predetermined command.

* * * * *